(12) United States Patent
Cho et al.

(10) Patent No.: US 10,736,153 B2
(45) Date of Patent: Aug. 4, 2020

(54) BEARER SETTING METHOD AND DEVICE SUPPORTING SAME FOR TRANSMITTING/RECEIVING DATA IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,530

(22) PCT Filed: Jan. 19, 2016

(86) PCT No.: PCT/KR2016/000526
§ 371 (c)(1),
(2) Date: Mar. 15, 2018

(87) PCT Pub. No.: WO2017/047878
PCT Pub. Date: Mar. 23, 2017

(65) Prior Publication Data
US 2018/0270873 A1    Sep. 20, 2018

Related U.S. Application Data

(60) Provisional application No. 62/219,140, filed on Sep. 16, 2015.

(51) Int. Cl.
*H04W 76/10* (2018.01)
*H04W 28/02* (2009.01)
(Continued)

(52) U.S. Cl.
CPC ............ *H04W 76/10* (2018.02); *H04W 8/02* (2013.01); *H04W 28/02* (2013.01);
(Continued)

(58) Field of Classification Search
None
See application file for complete search history.

(56) References Cited

U.S. PATENT DOCUMENTS

2004/0109433 A1* 6/2004 Khan ................... H04L 1/1614
370/345
2013/0279395 A1* 10/2013 Aramoto ............... H04W 76/32
370/312
(Continued)

FOREIGN PATENT DOCUMENTS

EP       2509345 A1    10/2012
EP       2768251 A1     8/2014
(Continued)

*Primary Examiner* — Thinh D Tran
(74) *Attorney, Agent, or Firm* — Birch, Stewart, Kolasch & Birch, LLP

(57) ABSTRACT

The present invention relates to a bearer setting method and device of a terminal for transmitting/receiving data in a wireless communication system. According to the present invention, a method may be provided which: receives specific data and transmission information for transmitting the specific data from an MME (Mobility Management Entity); receives bearer information including information on a specific bearer installed between the base station and a gateway from the MME; and transmits response data on the specific data transmitted from one or more terminals through the specific bearer.

19 Claims, 28 Drawing Sheets

(51) Int. Cl.
*H04W 76/12* (2018.01)
*H04W 8/02* (2009.01)
*H04W 72/04* (2009.01)
*H04W 76/11* (2018.01)
*H04W 76/27* (2018.01)
*H04W 88/02* (2009.01)
*H04W 88/08* (2009.01)

(52) U.S. Cl.
CPC ....... *H04W 72/0446* (2013.01); *H04W 76/12* (2018.02); *H04W 76/11* (2018.02); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2013/0294320 A1* | 11/2013 | Jactat | H04L 12/189 370/312 |
| 2013/0301611 A1 | 11/2013 | Baghel et al. | |
| 2014/0086131 A1* | 3/2014 | Seok | H04B 7/0452 370/311 |
| 2014/0177583 A1* | 6/2014 | Aso | H04L 63/126 370/329 |
| 2014/0219248 A1* | 8/2014 | Reddiboyana | H04W 76/15 370/371 |
| 2014/0355493 A1* | 12/2014 | Niu | H04W 76/40 370/280 |
| 2015/0003435 A1* | 1/2015 | Horn | H04L 5/0058 370/338 |
| 2015/0230241 A1 | 8/2015 | Lim et al. | |
| 2015/0282083 A1* | 10/2015 | Jeong | H04W 52/0216 370/311 |
| 2016/0007385 A1* | 1/2016 | Sedlacek | H04W 48/16 370/329 |

FOREIGN PATENT DOCUMENTS

| | | |
|---|---|---|
| JP | 2013-511862 A | 4/2013 |
| WO | WO 2009/133629 A1 | 11/2009 |
| WO | WO 2013/109082 A1 | 7/2013 |
| WO | WO 2014/069944 A1 | 5/2014 |
| WO | WO 2014/098393 A1 | 6/2014 |
| WO | WO 2015/041493 A1 | 3/2015 |

* cited by examiner

R/R/E/LCID sub-header

FIG. 12
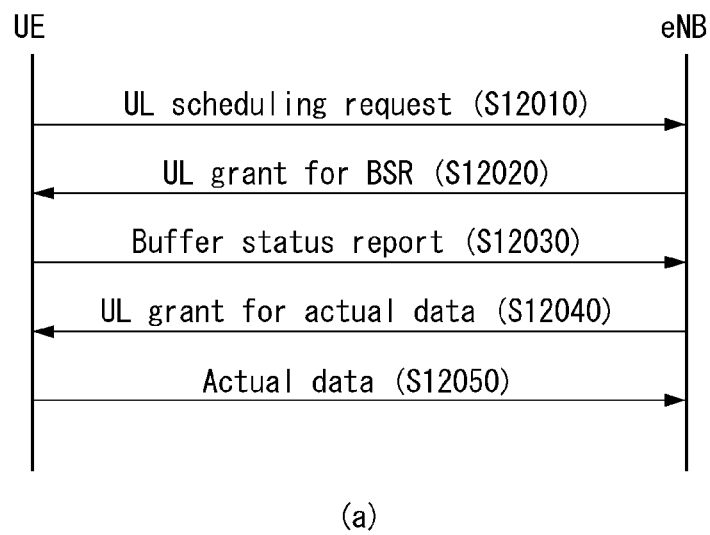
(a)
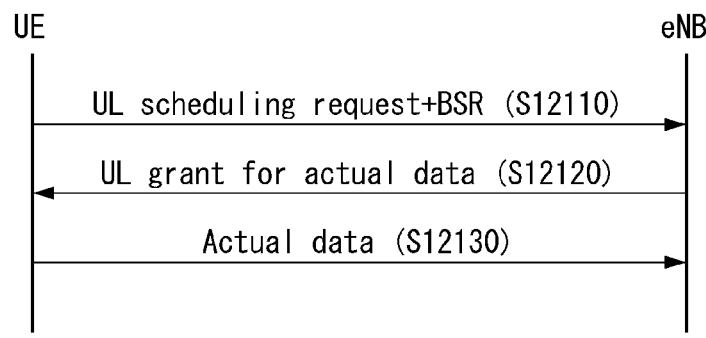
(b)

FIG. 25

| Body #1 Length | Body #1 | Body #3 |
|---|---|---|

BEARER SETTING METHOD AND DEVICE SUPPORTING SAME FOR TRANSMITTING/RECEIVING DATA IN WIRELESS COMMUNICATION SYSTEM

CROSS REFERENCE TO RELATED APPLICATIONS

This application is the National Phase of PCT International Application No. PCT/KR2016/000526, filed on Jan. 19, 2016, which claims priority under 35 U.S.C. 119(e) to U.S. Provisional Application No. 62/219,140, filed on Sep. 16, 2015, all of which are hereby expressly incorporated by reference into the present application.

TECHNICAL FIELD

The present invention relates to a method for a terminal to transmit or receive data in a wireless communication system and, more particularly, to a bear configuration method for providing a service in which reliability of data transmission/reception is important and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

The radio link availability of the current LTE/LTE-A system entirely depends on a network coverage provision probability, which is approximately 95%.

Furthermore, radio link reliability of the LTE/LTE-A system is assumed to be capable of providing sufficient reliability through H-ARQ retransmission by applying the block error rate (BER) 10-3 in the case of unicast data through a PDSCH regardless of a control plane (a C-plane) and a user plane (U-plane).

DISCLOSURE

Technical Problem

An object of the present invention is to provide a method for realizing "ultra-reliable and low latency communication" of 5G by breaking from the "best effort mobile broadband" of the current LTE/LTE-A system.

Furthermore, an object of the present invention is to provide a data transmission/reception method for providing a service that requires ultra-reliability and low latency.

Furthermore, an object of the present invention is to provide a bearer configuration method for providing a service that requires ultra-reliability and low latency.

Furthermore, an object of the present invention is to provide a method of configuring a separate bearer between a gateway and a base station in order to provide a service that requires ultra-reliability and low latency.

Furthermore, an object of the present invention is to provide a method of configuring a bearer configured in a base station unit between a gateway and a base station in order to provide a service that requires ultra-reliability and low latency.

Furthermore, an object of the present invention is to provide a method of configuring a separate bearer in order to transmit or receive data for providing a service that requires ultra-reliability and low latency.

Furthermore, an object of the present invention is to provide a method of configuring a bearer for transmitting/receiving a response to data for providing a service that requires ultra-reliability and low latency.

Technical objects to be achieved by this specification are not limited to the aforementioned technical objects, and other technical objects not described above may be evidently understood by a person having ordinary skill in the art to which the present invention pertains from the following description.

Technical Solution

In order to accomplish the objects, the present invention provides a method and apparatus for configuring a bearer for transmitting/receiving data in a wireless communication system.

Specifically, a bearer configuration method according to an embodiment of the present invention includes receiving specific data and transmission information for the transmission of the specific data from a mobility management entity (MME), wherein the data transmission information includes at least one of reception terminal information indicating at least one terminal which will receive the specific data, an indicator indicating whether response data of the at least one terminal for the specific data is necessary, and connection terminal information indicating terminals belonging to the at least one terminal and having a connection state with the base station; receiving bearer information including information related to a specific bearer configured between the base station and a gateway from the MME; and transmitting response data for the specific data transmitted by one or more terminals through the specific bearer, wherein the specific bearer is configured if the indicator indicates that the response data is necessary.

Furthermore, in the present invention, the data transmission information further includes at least one of type information of the specific data and identity code information of the specific data.

Furthermore, the present invention further includes the steps of transmitting configuration information for transmitting the specific data to the at least one terminal; transmitting the specific data to the at least one terminal based on the configuration information; and receiving a response message including the response data as a response to the specific data from the at least one terminal.

Furthermore, the present invention further includes the steps of transmitting bearer support information indicating whether a dedicated bearer configured between the terminal and the base station and support message type information indicating the type of message capable of being transmitted through the bearer in order to provide a service to the terminal; and configuring the dedicated bearer with the terminal.

Furthermore, in the present invention, the step of configuring the dedicated bearer includes the steps of receiving an RRC connection request message to request an RRC connection from the terminal and transmitting an RRC connection configuration message including configuration information of the dedicated bearer as a response to the RRC connection request message, wherein the RRC connection request message includes a cause field indicating an RRC connection request for transmitting/receiving the data of the service.

Furthermore, in the present invention, the step of configuring the dedicated bearer includes the steps of transmitting an RRC connection reconfiguration message including configuration information of the dedicated bearer to the terminal and receiving an RRC connection reconfiguration complete message as a response to the RRC connection reconfiguration message.

Furthermore, in the present invention, the configuration information is periodically transmitted through a paging message, a system information block or a notification message.

Furthermore, in the present invention, the configuration information includes at least one of the reception terminal information, the indicator, the connection terminal information, transmission interval information indicating an interval in which the specific data is transmitted, transmission cycle information indicating a cycle in which the specific data is transmitted, type information indicating the type of specific data, a wireless network identity for identifying a resource region in which the specific data is included, resource region information indicating a resource region in which the specific data is included, and identity code information for identifying the specific data.

Furthermore, in the present invention, the response message includes at least one of a first body field, a second body field, and a length field indicating a length of the body field.

Furthermore, in the present invention, the first body field includes at least one of the type information, the identity code information, and the identity, and the second body field includes the response data.

Furthermore, in the present invention, the bearer information includes at least one of a bearer ID indicating the bearer, message filtering information indicating a message capable of being transmitted/received through the bearer, quality of service (QoS) information of the message capable of being transmitted/received through the bearer, and an address of the gateway connected through the bearer.

Furthermore, in the present invention, if the terminal is a connection state, the configuration information includes a resource allocation indicator indicating whether a resource for the transmission of the response message has been allocated and time information indicating an allocation time of the resource.

Furthermore, the present invention further includes the step of transmitting resource information indicating the allocated resource to the terminal, wherein the response message is transmitted through the allocated resource.

Furthermore, the present invention further includes the steps of receiving an RRC connection request message to request an RRC connection from the terminal; transmitting an RRC connection configuration message including at least one of configuration information of a dedicated bearer configured between the terminal and the base station and a resource allocation indicator indicating whether a resource for the transmission of the response message has been allocated as a response to the RRC connection request message; and transmitting resource information indicating the allocated resource to the terminal, wherein the RRC connection request message includes a cause field indicating an RRC connection request for transmitting/receiving the data of a service, and the response message is transmitted through the allocated resource.

Furthermore, the present invention further includes the steps of receiving a request message to request the transmission of the response message from the terminal and transmitting a response message including resource information for transmitting the response message to the terminal, wherein the response message is transmitted based on the resource information.

Furthermore, in the present invention, the request message includes at least one of a transmission/reception indicator indicating whether the request message is a message for transmission, a dedicated bearer indicator indicating whether a transmission path of the response message is the dedicated bearer, identity code information indicating a response to the specific data, and type information indicating the type of response data.

Furthermore, the present invention provides a method, including the steps of receiving configuration information for transmitting specific data from a base station; receiving the specific data based on the configuration information from the base station and transmitting a response message including the response data as a response to the specific data to the base station, wherein the configuration information includes at least one of reception terminal information indicating at least one terminal which will receive the specific data, an indicator indicating whether response data of the at least one terminal for the specific data is necessary, transmission interval information indicating an interval in which the specific data is transmitted, transmission cycle information indicating a cycle in which the specific data is transmitted, type information indicating the type of the specific data, an identity for identifying a resource region of the specific data, resource region information indicating a resource region in which the specific data is included, and identity code information for identifying the specific data, and the specific bearer is configured if the indicator indicates that the response data is necessary.

Furthermore, the present invention provides a base station, including a communication unit transmitting/receiving radio signals to/from an outside and a processor functionally coupled to the communication unit, wherein the processor receives specific data and transmission information for the transmission of the specific data from a mobility management entity (MME), the data transmission information including at least one of reception terminal information indicating at least one terminal which will receive the specific data, an indicator indicating whether response data of the at least one terminal for the specific data is necessary, and connection terminal information indicating terminals belonging to the at least one terminal and having a connection state with the base station, receives bearer information including information related to a specific bearer configured between the base station and a gateway from the MME, and transmits response data for the specific data transmitted by one or more terminals through the specific bearer, and the specific bearer is configured if the indicator indicates that the response data is necessary.

Advantageous Effects

The present invention can provide a service that requires ultra-reliability and low latency by defining the method of configuring a bearer for transmitting/receiving data in a wireless communication system.

Furthermore, the present invention can configure a separate bearer between a terminal and a base station for the transmission/reception of a response to data transmitted to a plurality of terminals.

Furthermore, the present invention can configure a bearer in a base station unit between a network node and a base station for the transmission/reception of a response to data transmitted to a plurality of terminals.

Furthermore, the present invention can reduce overhead and latency by managing a bearer in a base station unit by configuring a separate bearer for the transmission/reception of a response to data transmitted to a plurality of terminals.

Furthermore, the present invention can secure high scheduling priority through a separate buffer and an uplink resource request by configuring a separate bearer for the transmission/reception of a response to data transmitted to a plurality of terminals.

Effects which may be obtained by this specification are not limited to the aforementioned effects, and other technical effects not described above may be evidently understood by a person having ordinary skill in the art to which the present invention pertains from the following description.

DESCRIPTION OF DRAWINGS

FIG. 12 illustrates latency required for each process of a contention-based random access procedure required by the 3GPP LTE-A system to which the present invention can be applied.

FIGS. 24 and 25 are diagrams showing examples of a method for a terminal in the connected state to transmit/receive data through a bearer in a wireless communication system to which the present invention may be applied and a data format.

MODE FOR INVENTION

Figure 1:
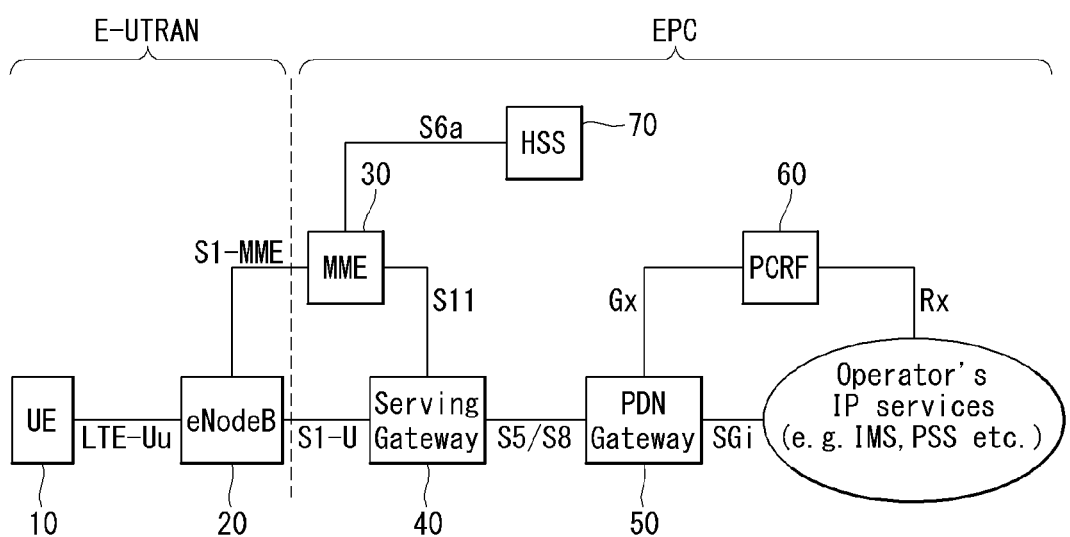
FIG. 1 is a view illustrating an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a message, frame, a signal, field and an apparatus are not limited to each of the names as for the purpose of explaining the invention, and may be replaced with a other message, other frame, a other signal, other field and a other apparatus that performs the same function.

In this specification, a base station has a meaning as a terminal node of a network that directly performs communication with a terminal. In this document, a specific operation described to be performed by a base station may be performed by an upper node of the base station according to circumstances. That is, it is evident that in a network including a plurality of network nodes including a base station, various operations performed for communication with a terminal may be performed by the base station or other network nodes other than the base station. A "base station (BS)" may be substituted with a term, such as a fixed station, a node B, an evolved-NodeB (eNB), a base transceiver system (BTS), an access point (AP), a macro eNB (MeNB) or a secondary the eNB (SeNB).

Furthermore, the "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Furthermore, each step described in the present invention may be performed without being limited to the sequence of the steps.

Hereinafter, the downlink (DL) means communication from a base station to a terminal, and the uplink (UL) means communication from a terminal to a base station. In the downlink, a transmitter may be part of a base station, and a receiver may be part of a terminal. In the uplink, a transmitter may be part of a terminal, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LIE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
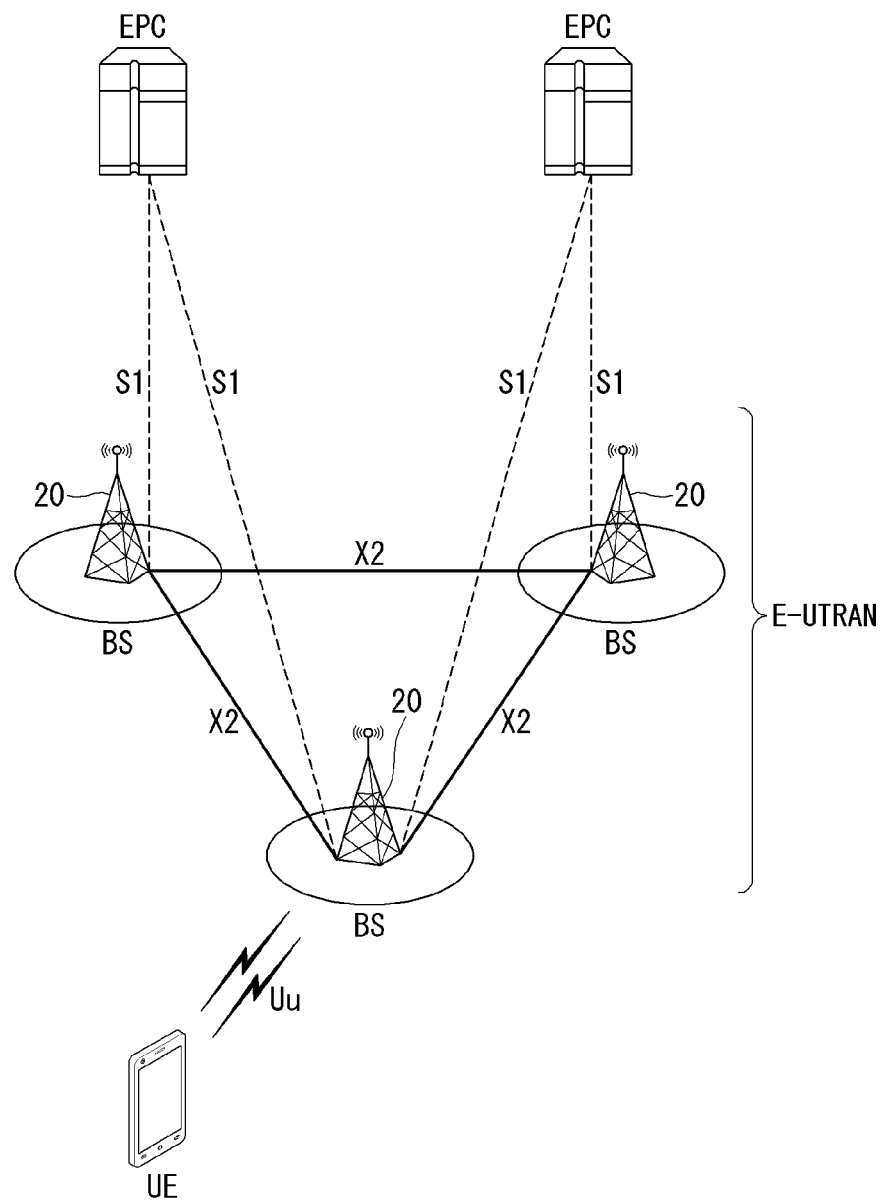
FIG. 2 shows a wireless communication system to which the present invention is applied.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
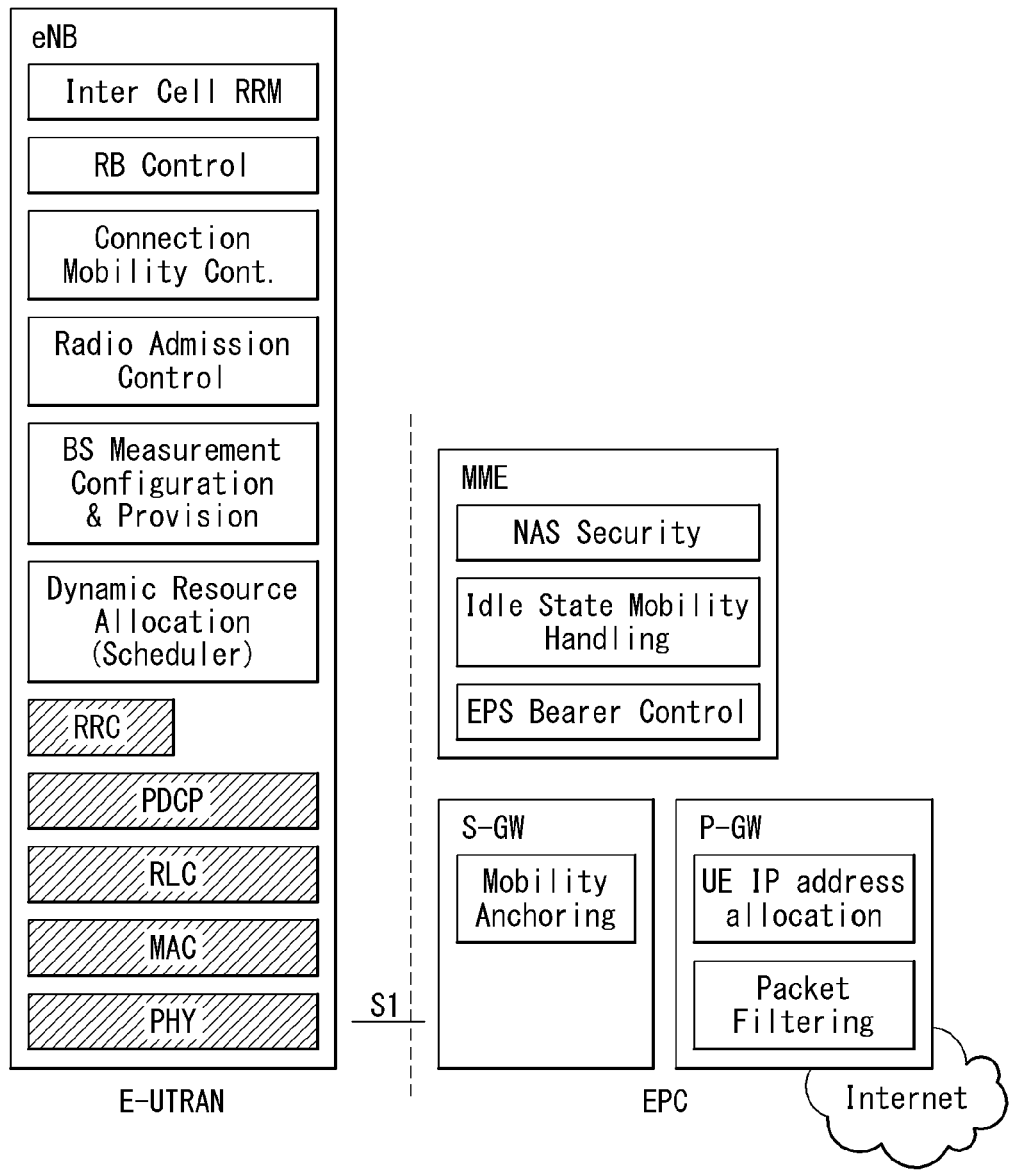
FIG. 3 illustrates a functional split of an E-UTRAN and an EPC to which the present invention can be applied.

FIG. 3 illustrates a functional split of an E-UTRAN and an EPC to which the present invention can be applied.

Referring to FIG. 3, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a terminal, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of terminal mobility.

Figure 4:
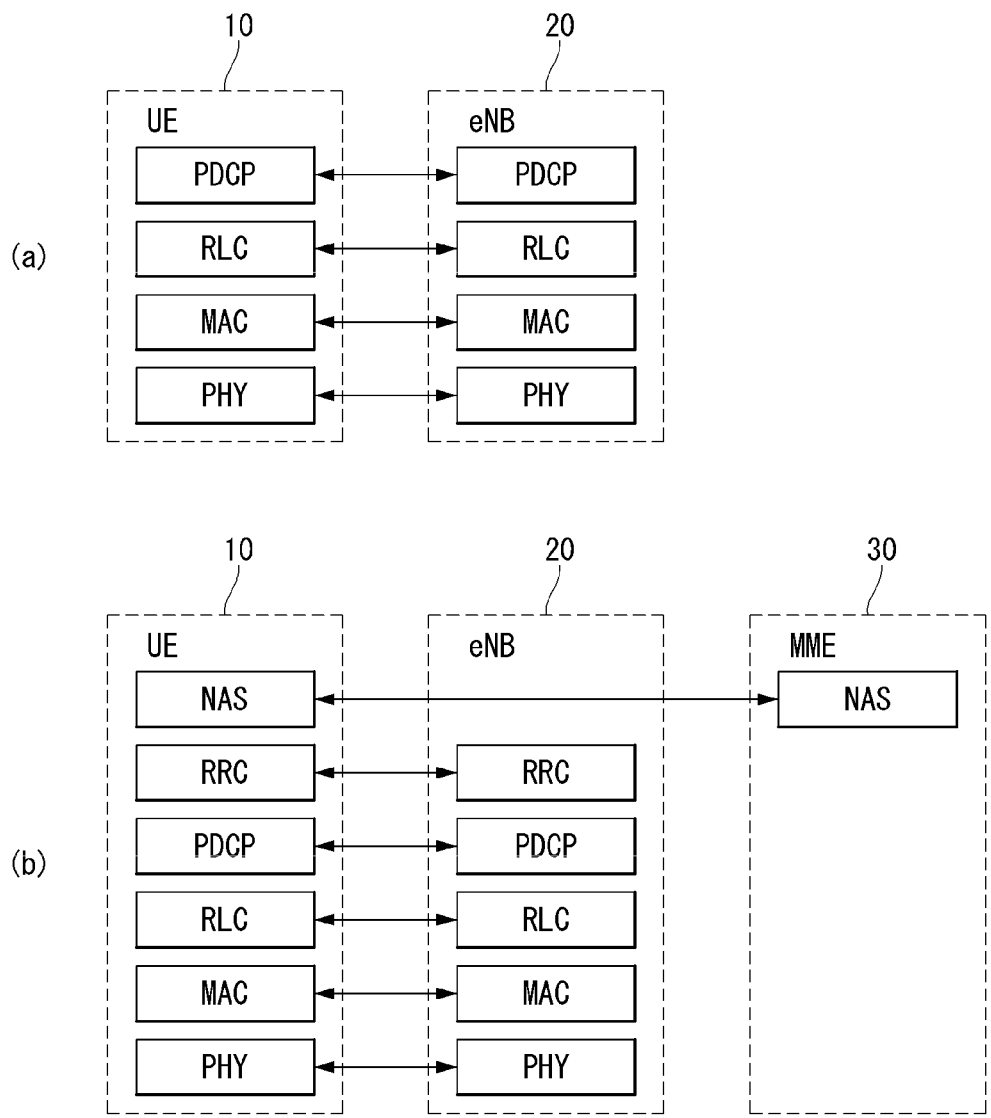
FIG. 4 is a block diagram showing an example of radio protocol architecture to which the technical characteristics of the present invention may be applied.

FIG. 4 is a block diagram showing an example of radio protocol architecture to which the technical characteristics of the present invention may be applied.

FIG. 4(*a*) shows an example of radio protocol architecture for a user plane, and FIG. 4(*b*) is a block diagram showing an example of radio protocol architecture for a control plane.

The user plane is a protocol stack for user data transmission, and the control plane is a protocol stack for control signal transmission.

Referring to FIGS. 4(*a*) and 4(*b*), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "I" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a terminal and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a terminal and the RRC layer of an E-UTRAN, the terminal is in the RRC connected state. If not, the terminal is in the RRC idle state.

A downlink transport channel through which a network transmits data to a terminal includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a terminal transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

Figure 5:
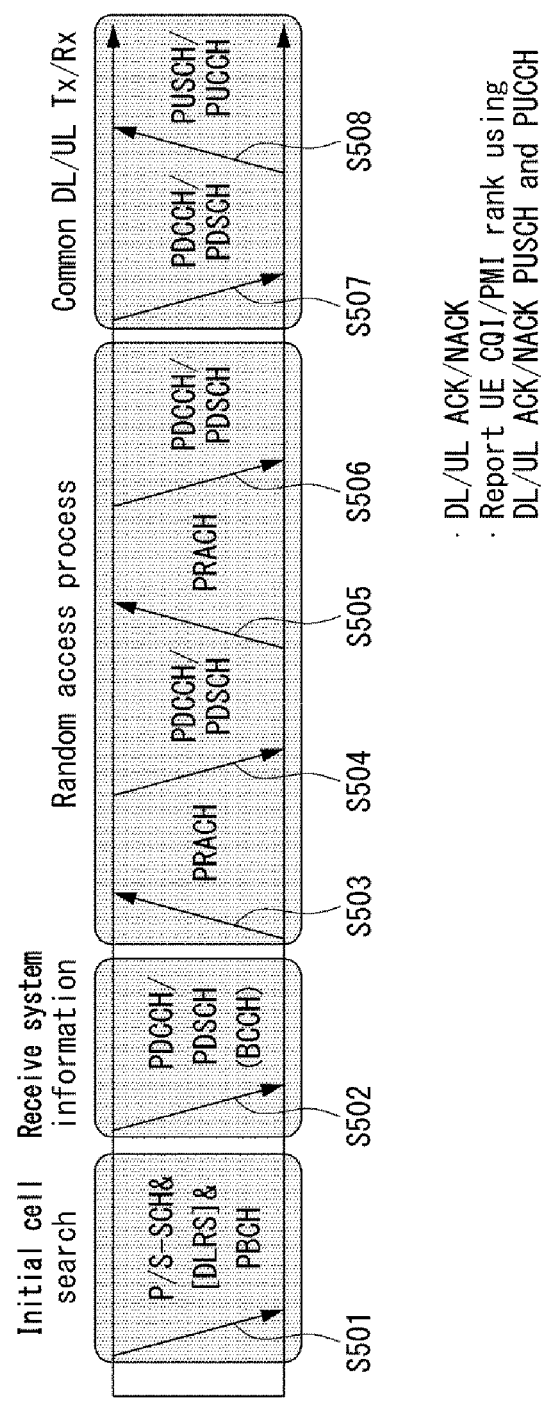
FIG. 5 illustrates physical channels used for the 3GPP LTE/LTE-A system to which the present invention can be applied and a general signal transmission method using the physical channels.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Hereinafter, the RRC state and RRC connection method of a terminal is described in detail.

The RRC state means whether the RRC layer of a terminal has been logically connected to the RRC layer of an E-UTRAN. A case where the RRC layer has been connected is called an RRC connected state, and a case where the RRC layer has not been connected is called an RRC idle state. A terminal in the RRC connected state has an RRC connection, and thus an E-UTRAN may check the presence of the corresponding terminal in a cell unit, thus being capable of effectively controlling the terminal.

In contrast, a terminal in the RRC idle state cannot be checked by an E-UTRAN and is managed by a core network (CN) in a tracking area unit, that is, an area unit greater than a cell. That is, whether the terminal in the RRC idle state is present in a large area unit is checked. In order to receive a common mobile communication service, such as voice or data, the terminal needs to switch to the RRC connected state.

When a user first turns on a terminal, the terminal first searches for a proper cell and then stays in the RRC idle state in the corresponding cell. When the terminal in the RRC idle state needs to set up an RRC connection, it establishes the RRC connection with an E-UTRAN through an RRC connection procedure and switches to the RRC connected state. A case where the terminal in the RRC idle state needs to establish an RRC connection includes several cases, and may include the necessity of uplink data transmission for a reason, such as a call attempt by a user, for example, or response message transmission when a paging message is received from an E-UTRAN.

A non-access stratum (NAS) layer located over the RRC layer performs the functions of session management and mobility management.

In order to manage the mobility of a terminal in the NAS layer, two types of state; such as EPS Mobility Management-REGISTERED (EMM-REGISTERED) and EMM-DEREGISTERED have been defined. The two states are applied to the terminal and the MME. Initially, the terminal is in the EMM-DEREGISTERED state. The terminal performs a process of registering with a corresponding network through an initial attach procedure in order to access a network. When the attach procedure is successfully performed, the terminal and the MME become the EMM-REGISTERED state.

In order to manage a signaling connection between a terminal and an EPC, two states of an EPS connection management (ECM)-IDLE state and an ECM-CONNECTED state have been defined. The two states are applied to the terminal and the MME. When the terminal in the ECM-IDLE state sets up an RRC connection with an E-UTRAN, the corresponding terminal becomes the ECM-CONNECTED state.

When the MME in the ECM-IDLE state sets up an S1 connection with the E-UTRAN, it becomes the ECM-CONNECTED state. When the terminal is in the ECM-IDLE state, the E-UTRAN does not have context information of the terminal. Accordingly, the terminal in the ECM-IDLE state performs a terminal-based mobility-related procedure, such as cell selection or cell reselection, without a command from a network. In contrast, when the terminal is in the ECM-CONNECTED state, the mobility of the terminal is managed by a command from the network. If the location of the terminal in the ECM-IDLE state is different from that known to the network, the terminal notifies the network of the corresponding location of the terminal through a tracking area update procedure.

System information is described below.

System information includes essential information that must be known to a terminal in order for the terminal to access a base station. Accordingly, the terminal must have received all of pieces of system information before it accesses the base station and must always have the newest system information. Furthermore, the system information is information that must be known to all of terminals within one cell, and a base station periodically transmits the system information.

In accordance with Paragraph 5.2.2 of 3GPP TS 36.331 V8.7.0 (2009-09) "Radio Resource Control (RRC); Protocol specification (Release 8)", system information is divided into a master information block (MIB), a scheduling block (SB), and a system information block (SIB). The MIB allows a terminal to be aware of the physical configuration, for example, a bandwidth of a corresponding cell. The SB provides notification of transmission information, for example, the transmission cycle of SIBs. The SIB is an assembly of pieces of related system information. For example, which SIB includes only information of a neighboring cell, and which SIB includes only information of an uplink radio channel used by a terminal.

Figure 6:
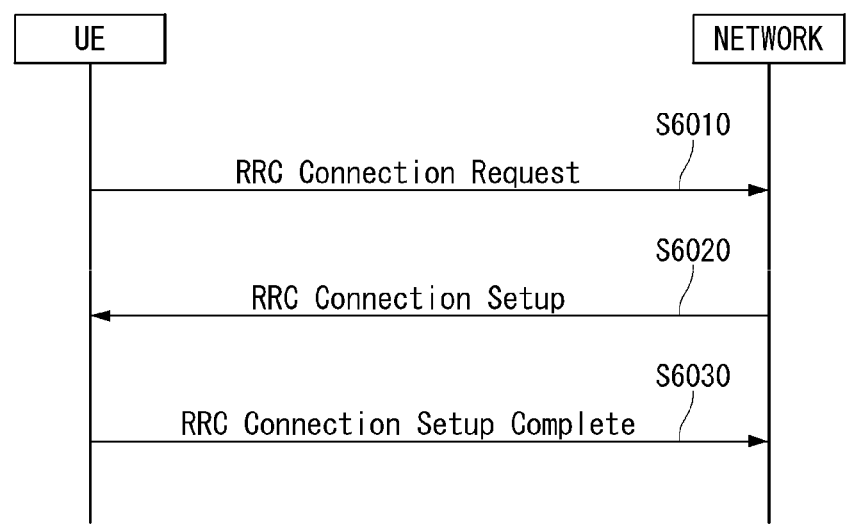
FIG. 6 is a flowchart showing an RRC connection establishment procedure to which the present invention can be applied.

FIG. 6 is a flowchart showing an RRC connection establishment procedure to which the present invention can be applied.

A UE sends to a network an RRC connection request message for requesting an RRC connection (step S6010). The network sends an RRC connection setup message in response to the RRC connection request (step S6020). After receiving the RRC connection setup message, the UE enters an RRC connection mode.

The UE sends to the network an RRC connection setup complete message used to confirm successful completion of the RRC connection establishment (step S6030).

Figure 7:
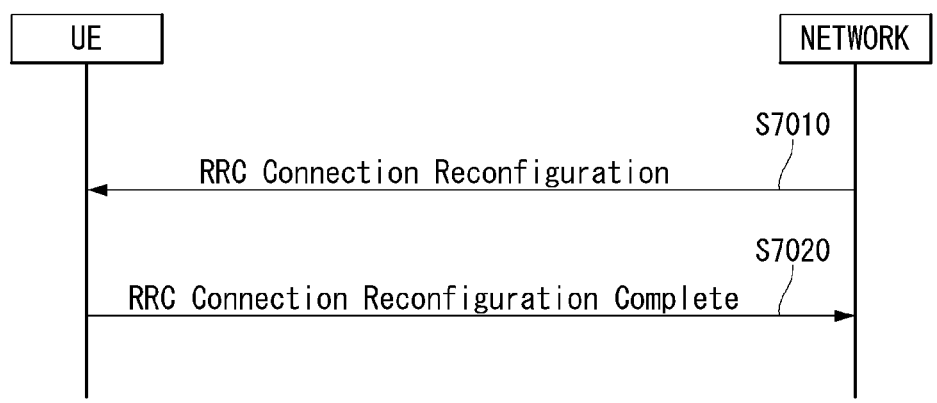
FIG. 7 is a flowchart showing an RRC connection reconfiguration procedure to which the present invention can be applied.

FIG. 7 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S7010). In response to the RRC connection reconfiguration, the UE sends to the network an RRC connection reconfiguration complete message used to confirm successful completion of the RRC connection reconfiguration (step S7020).

Buffer Status Reporting (BSR)

Figure 8:
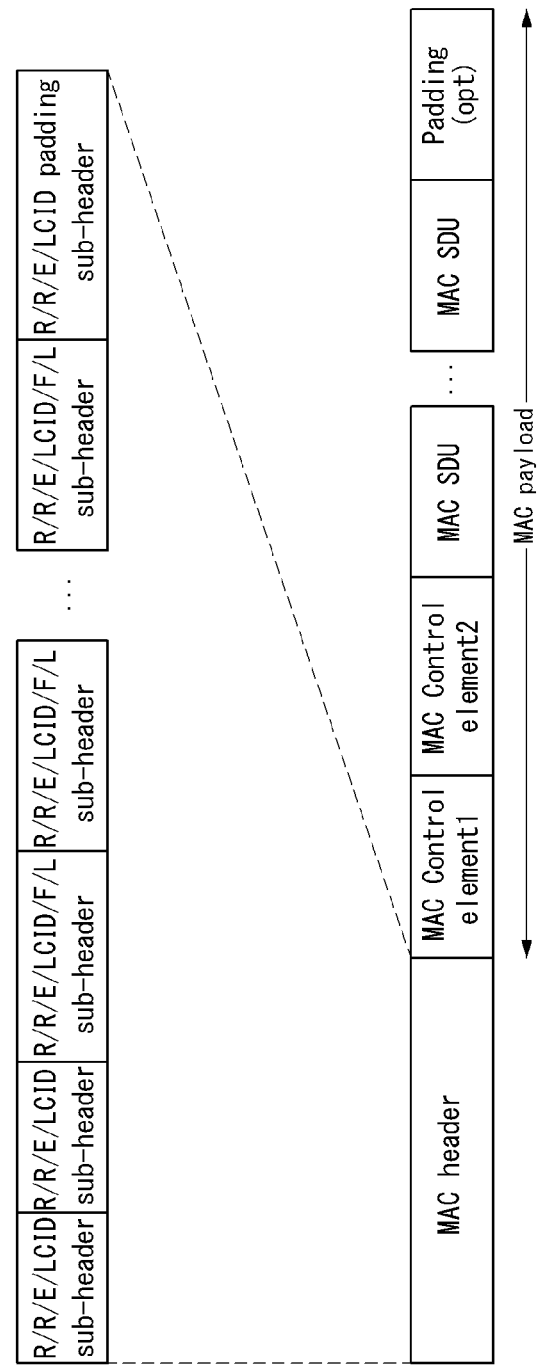
FIG. 8 illustrates a format of an MAC control element for reporting a buffer state in a wireless communication system to which the present invention can be applied.

FIG. 8 illustrates an MAC PDU used by an MAC entity in a wireless communication system to which the present invention can be applied.

With reference to FIG. 8, the MAC PDU includes an MAC header, at least one MAC service data unit (SDU), and at least one MAC control element; and may further comprise padding. Depending on the situation, at least one of the MAC SDU and the MAC control element may not be included in the MAC PDU.

As shown in FIG. 8, the MAC control element usually precedes the MAC SDU. And the size of the MAC control element can be fixed or varied. In case the size of the MAC control element is variable, whether the size of the MAC control element has been increased can be determined through an extended bit. The size of the MAC SDU can also be varied.

The MAC header can include at least one or more sub-headers. At this time, at least one or more sub-headers included in the MAC header correspond to the MAC SDU, MAC control element, and padding, respectively, which the order of the sub-headers is the same as the disposition order of the corresponding elements. For example, as shown in FIG. 10, if the MAC PDU includes an MAC control element 1, an MAC control element 2, a plurality of MAC SDUs, and padding, sub-headers can be disposed in the MAC header so that a sub-header corresponding to the MAC control element 1, a sub-header corresponding to the MAC control element 2, a plurality of sub-headers corresponding respectively to the plurality of MAC SDUs, and a sub-header corresponding to padding can be disposed according to the corresponding order.

The sub-header included in the MAC header, as shown in FIG. 12, can include 6 header fields. More specifically, the sub-header can include 6 header fields of R/R/E/LCID/F/L.

As shown in FIG. 8, for the sub-header corresponding to the MAC control element of a fixed size and the sub-header corresponding to the last one among the data fields included in the MAC PDU, sub-headers including 4 header fields can be used. Therefore, in case a sub-header includes 4 fields, the four fields can be R/R/E/LCID.

Figure 9:
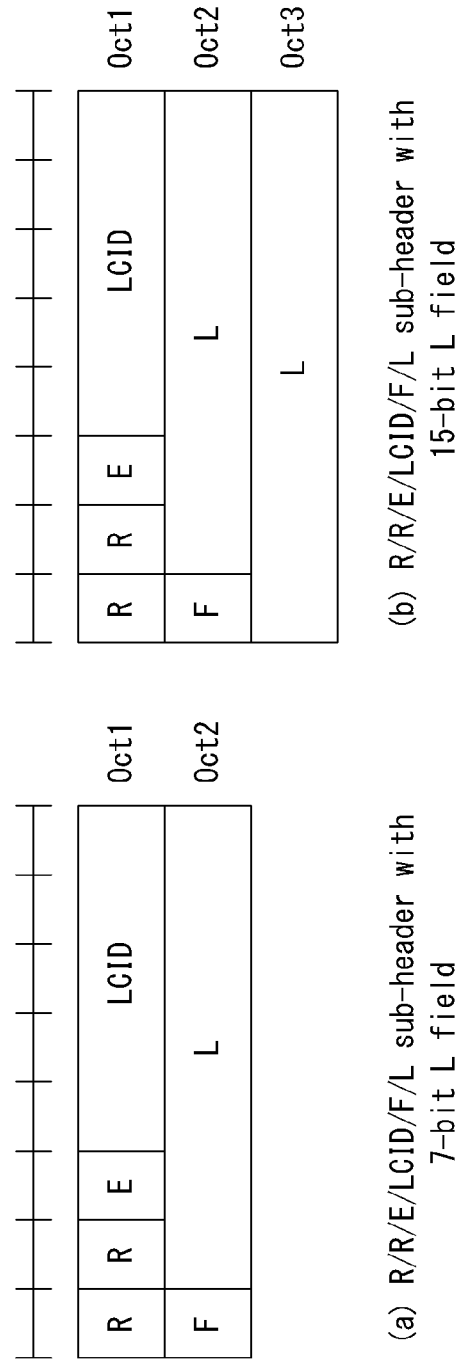
FIG. 9 illustrates one example of a component carrier and carrier aggregation in a wireless communication system to which the present invention can be applied.
Figure 10:
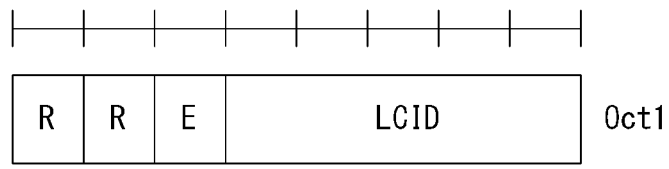
FIG. 10 illustrates a contention-based random access procedure in a wireless communication system to which the present invention can be applied.

FIGS. 9 and 10 illustrate a sub-header of an MAC PDU in a wireless communication system to which the present invention can be applied.

In the following, each field is described with reference to FIGS. 9 and 10.

1) R: Reserved bit, not used.

2) E: Extended bit, indicating whether the element corresponding to a sub-header is extended. For example, if E field is '0', the element corresponding to the sub-header is terminated without repetition; if E field is '1', the element corresponding to the sub-header is repeated one more time and the length of the element is increased twice of the original length.

3) LCID: Logical Channel Identification. This field is used for identifying a logical channel corresponding to the MAC SDU or identifying the corresponding MAC control element and padding type. If the MAC SDU is related to a sub-header, this field then indicates a logical channel which the MAC SDU corresponds to. If the MAC control element is related to a sub-header, then this field can describe what the MAC control element is like.

Table 1 shows the LCID values for DL-SCH.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 2 shows LCID values for an UL-SCH.

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE can report its buffer state to the network by setting an index value for any of a truncated BSR in the LCID field, a short BSR, and a long BSR.

The index values and a mapping relationship of the LCID values of Tables 1 and 2 are shown for an illustrative purpose, and the present invention is not limited to the example.

4) F: Format field. Represents the size of the L field

5) L: Length field. Represents the size of the MAC SDU corresponding to a sub-header and the size of the MAC control element. If the size of the MAC SDU corresponding to a sub-header or the size of the MAC control element is equal to or smaller than 127 bits, 7 bits of the L field can be used (FIG. 9(a)) and 15 bits of the L field can be used for the other cases (FIG. 9(b)). In case the size of the MAC control element varies, the size of the MAC control element can be defined through the L field. In case the size of the MAC control element is fixed, the F and the L field may be omitted as shown in FIG. 10 since the size of the MAC control element can be determined without defining the size of the MAC control element through the L field.

Figure 11:
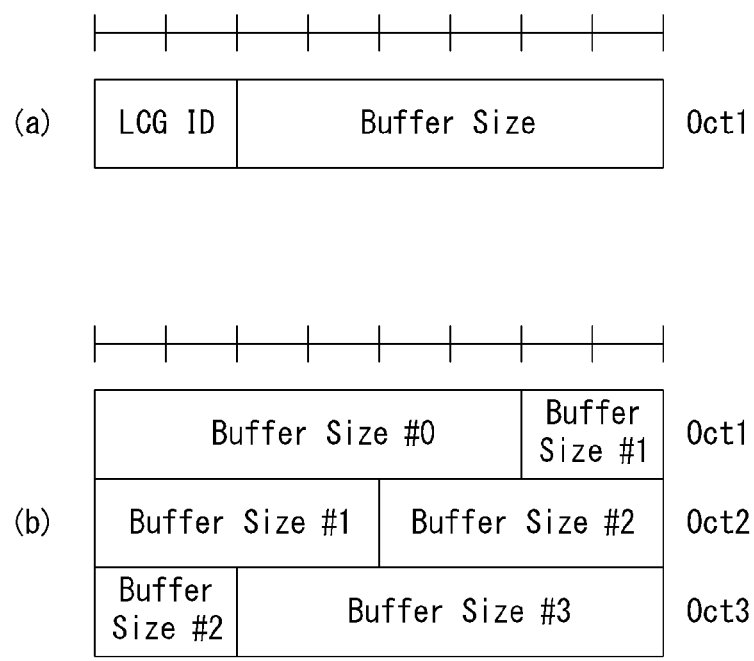
FIG. 11 illustrates a non-contention based random access procedure in a wireless communication system to which the present invention can be applied.

FIG. 11 illustrates a format of an MAC control element for reporting a buffer state in a wireless communication system to which the present invention can be applied.

In case the truncated BSR and short BSR are defined in the LCID field, the MAC control element corresponding to a sub-header can be configured to include a logical channel group identification (LCG ID) field and a buffer size field indicating a buffer state of the logical channel group as shown in FIG. 11(a). The LCG ID field is intended to identify a logical channel group to which to report a buffer state and can have the size of two bits.

The buffer size field is intended to identify the total amount of data available for all of the logical channels belonging to a logical channel group after the MAC PDU is created. The available data include all of the data that can be transmitted from the RLC layer and the PDCP layer, and the amount of data is represented by the number of bytes. The buffer size field can have the size of 6 bits.

In case a long BSR is defined for the LCID field of a sub-header, the MAC control element corresponding to a sub-header can include 4 buffer size fields indicating buffer states of the four groups having LCG IDs ranging from 0 to 3 as shown in FIG. 11(b). Each buffer size field can be used to identify the total amount of data available for each logical channel group.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 12 illustrates an uplink resource allocation process of a UE in a wireless communication system to which the present invention can be applied.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 12(a) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 12(a) illustrates the case where the PUSCH resources for transmitting BSR are not allocated to the UE, and the UE first of all transmits a scheduling request (SR) to the eNB to receive PUSCH resources S12010.

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S12020, the UE transmits the BSR to the eNB, which has been triggered through the PUSCH resources allocated by the UL grant S12030.

By using the BSR, the eNB checks the amount of data for the UE to actually transmit through uplink transmission and transmits to the UE an UL grant with respect to the PUSCH resources for transmission of actual data S12040. The UE, which has received the UL grant meant for transmission of actual data, transmits to the eNB actual uplink data through the allocated PUSCH resources S12050.

FIG. 12(b) illustrates an uplink resource allocation process for actual data in case the uplink radio resources for buffer status reporting are allocated to the UE.

FIG. 12(b) illustrates the case where the PUSCH resources for BSR transmission have already been allocated to the UE; the UE transmits the BSR through the allocated PUSCH resources and transmits a scheduling request to the eNB along with the BSR transmission S12110. Next, by using the BSR, the eNB check the amount of data that the UE actually transmits through uplink transmission and transmits to the UE an UL grant with respect to the PUSCH resources for transmission of actual data S12120. The UE, which has received an UL grant for transmission of actual data, transmits actual uplink data to the eNB through the allocated PUSCH resources S12130.

Random Access Procedure (RACH)

Figure 13:
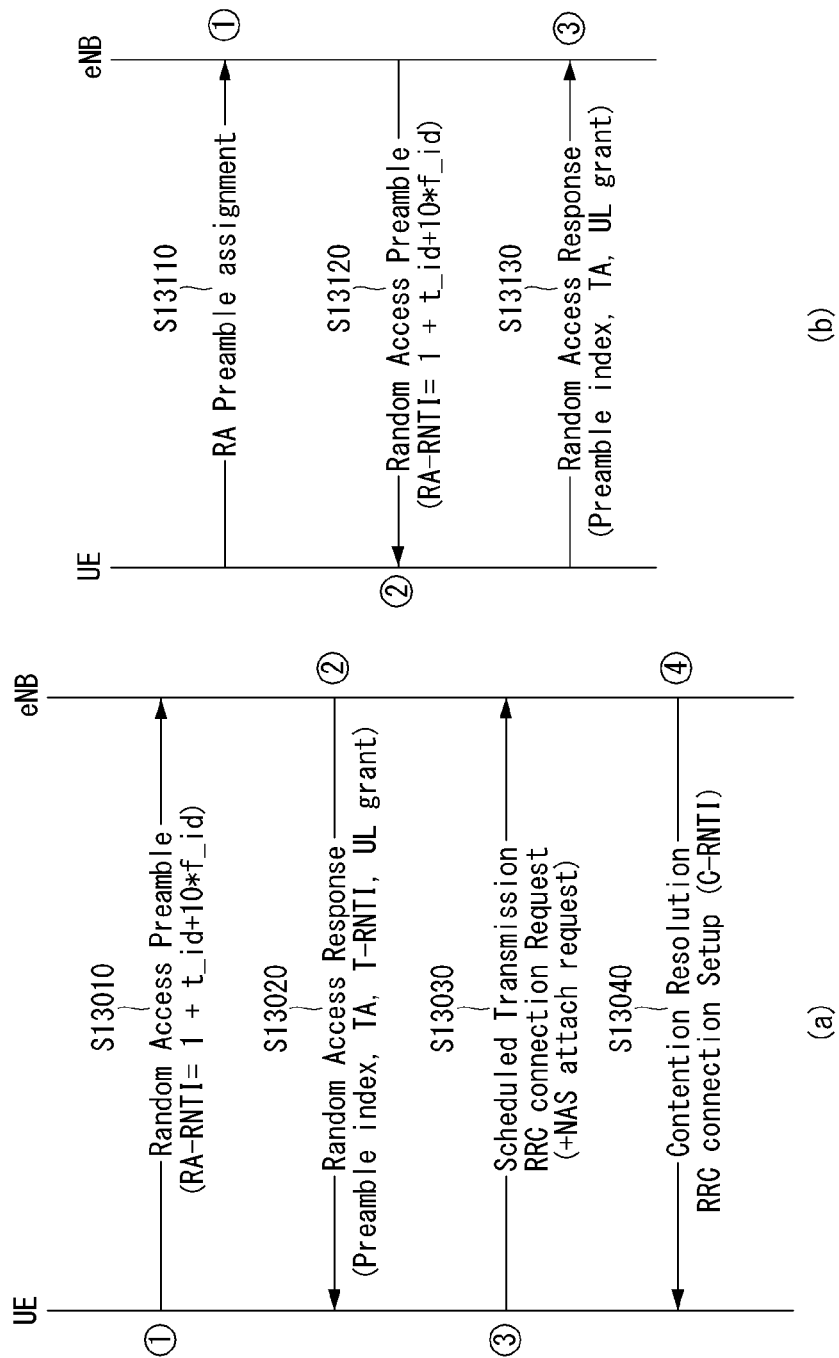
FIG. 13 illustrates one example of a random access procedure in the LTE system.

FIG. 13 illustrates one example of a random access procedure in the LTE system.

The UE carries out the random access procedure (RACH) at the time of the initial connection in the RRC_IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink. Two types of random access procedure are defined: contention based and non-contention based random access procedure.

FIG. 13(a) illustrates one example of a contention based random access procedure, while FIG. 13(b) illustrates one example of a non-contention based random access procedure.

First, contention based random access procedure will be described with reference to FIG. 13(a).

The UE receives information about random access from the eNB through system information and stores the received information. Afterwards, in case random access is required, the UE transmits a random access preamble (which is also called a message 1) to the base station S13010.

If the eNB receives a random access preamble from the UE, the eNB transmits a random access response (which is also called a message 2) to the UE S13020. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) S13040.

Next, non-contention based random access procedure will be described with reference to FIG. 13(b).

Before the UE transmits a random access preamble, the eNB allocates a non-contention based random access preamble to the UE S13110.

The non-contention based random access preamble can be allocated through a handover command or dedicated signaling such as a PDCCH. In case a non-contention based random access preamble is allocated to the UE, the UE transmits the allocated non-contention based random access preamble to the eNB S13120.

Afterwards, the eNB is able to transmit a random access response (which is also called a message 2) to the UE similarly to the S2002 step of the contention based random access procedure S13130.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

Next, a UL data transmission method in the LTA(-A) or 802.16 system will be described briefly.

A cellular system such as the LTE(-A) or 802.16m system employs an eNB scheduling-based resource allocation method.

In a system which employs the eNB scheduling based resource allocation method, the UE with data to be transmitted (i.e., UL data) requests resources for transmission of the corresponding data from the eNB before transmitting the data.

The scheduling request of the UE can be carried out through Scheduling Request (SR) transmission to a PUCCH or Buffer Status Report (BSR) transmission to a PUSCH.

Also, in case resources used for transmitting SR or BSR are not limited to the UE, the UE can request uplink resources from the eNB through an RACH procedure.

As described above, the eNB which has received a scheduling request from the UE allocates uplink resources to be used for the corresponding UE through a downlink control channel (i.e., UL grant message or DCI in the case of the LTE(-A) system).

At this time, a UL grant transmitted to the UE may be used to inform the UE of which subframe the resources allocated to the UE correspond to through explicit signaling, but the UL grant may be used to define a predefined timing between the UE and the eNB for resource allocation with respect to a subframe after specific time (for example, 4 ms in the case of the LTE system).

As described above, the eNB's allocating resources to the UE after X ms (for example, 4 ms in the case of the LTE(-A) system) implies that the UE allocates resources by taking into account all of the time periods for the UE to receive and decode a UL grant, to prepare data to be transmitted, and to encode the prepared data.

EMM and ECM State

EPS mobility management (EMM) and an EPS connection management (ECM) state are described.

Figure 14:
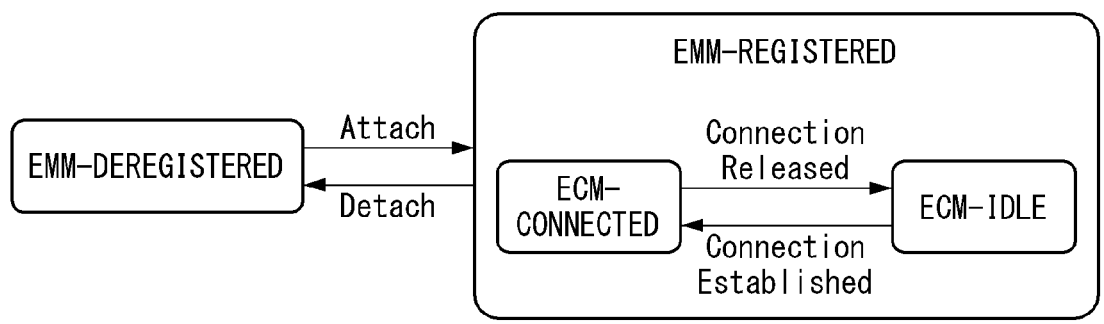
FIG. 14 is a diagram illustrating EMM and an ECM state in a wireless communication system to which the present invention may be applied.

FIG. 14 is a diagram illustrating EMM and an ECM state in a wireless communication system to which the present invention may be applied.

Referring to FIG. 14, in order to manage the mobility of a terminal in the NAS layer located in the control plane of the terminal and the MME, an EMM registration state (EMM-REGISTERED) and an EMM deregistration state (EMM-DEREGISTERED) may be defined depending on whether the terminal has been attached to or detached from a network. The EMM-REGISTERED state and the EMM-DEREGISTERED state may be applied to the terminal and the MME.

At the initial stage, such as a case where a terminal is first powered on, the terminal is in the EMM-DEREGISTERED state. In order to access the network, the terminal performs a process of registering with the corresponding network through an initial attach procedure. When the connection procedure is successfully performed, the terminal and the MME make transition to the EMM-REGISTERED state.

Furthermore, if the terminal is powered off or a radio link fails (if a packet error rate exceeds a reference value on the radio link), the terminal is detached from the network and makes transition to the EMM-DEREGISTERED state.

Furthermore, in order to manage a signaling connection between the terminal and the network, an ECM connected state (ECM-CONNECTED) and an ECM idle state (ECM-IDLE) may be defined. The ECM-CONNECTED state and the ECM-IDLE state may also be applied to the terminal and the MME. An ECM connection includes an RRC connection established between a terminal and a base station and an S1 signaling connection established between a base station and an MME. That is, what an ECM connection has been established/released means that both the RRC connection and the S1 signaling connection have been established/released.

An RRC state indicates whether the RRC layer of a terminal and the RRC layer of a base station have been logically connected. That is, if the RRC layer of the terminal and the RRC layer of the base station are connected, the terminal is in the RRC connected state (RRC_CONNECTED). If the RRC layer of the terminal and the RRC layer of the base station are not connected, the terminal is in the RRC idle state (RRC_IDLE).

A network may check the presence of a terminal in the ECM-CONNECTED state in a cell unit and can effectively control the terminal.

In contrast, the network cannot check the presence of the terminal in the ECM-IDLE state, and a core network (CN) manages the terminal in a tracking area unit, that is, an area unit larger than a cell. When the terminal is in the ECM idle state, the terminal performs discontinuous reception (DRX) configured by NAS using an ID uniquely allocated in a tracking area. That is, the terminal may receive the broadcasting of system information and paging information by monitoring a paging signal at a specific paging occasion every terminal-specific paging DRX cycle.

Furthermore, when the terminal is in the ECM-IDLE state, the network does not have context information of the terminal. Accordingly, the terminal in the ECM-IDLE state may perform a terminal-based mobility-related procedure, such as cell selection or cell reselection, without a need to receive a command from the network. If the location of the terminal in the ECM idle state is different from that known to the network, the terminal may notify the network of the location of the corresponding terminal through a tracking area update (TAU) procedure.

In contrast, when the terminal is in the ECM-CONNECTED state, the mobility of the terminal is managed by a command from the network. In the ECM-CONNECTED state, the network is aware of a cell to which the terminal belongs. Accordingly, the network may transmit and/or receive data to the terminal or from the terminal, may control mobility, such as handover of the terminal, and may perform cell measurement for a neighboring cell.

As described above, in order for a terminal to receive a common mobile communication service such as voice or data, the terminal must shift to the ECM-CONNECTED state. At the initial stage, such as a case where the terminal is first powered on, the terminal is in the ECM-IDLE state like the EMM state. When the terminal is successfully registered with a corresponding network through an initial attach procedure, the terminal and an MME make transition to the ECM connected state. Furthermore, if the terminal has been registered with the network, but a radio resource has not been allocated because traffic has been deactivated, the terminal is in the ECM-IDLE state. When uplink or downlink new traffic is generated in the corresponding terminal, the terminal and the MME make transition to the ECM-CONNECTED state through a service request procedure.

Figure 15:
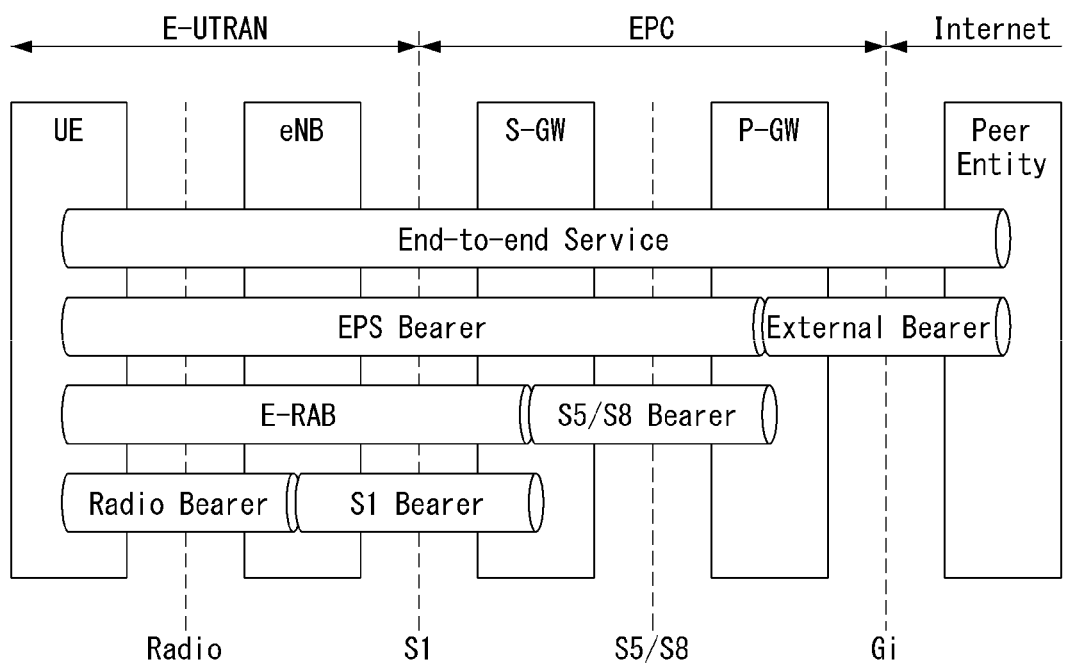
FIG. 15 is a diagram illustrating a bearer structure in a wireless communication system to which the present invention may be applied.

FIG. 15 is a diagram illustrating a bearer structure in a wireless communication system to which the present invention may be applied.

When a terminal is connected to a packet data network (PDN) (the peer entity in FIG. 7), a PDN connection is generated and the PDN connection may also be called an EPS session. The PDN is an Internet protocol (IP) network inside or outside a service provider and provides the same service function as an IP multimedia subsystem (IMS).

The EPS session has one or more EPS bearer. The EPS bearer is the transmission path of traffic generated between a terminal and a PDN GW in order for the EPS to transfer user traffic. One or more EPS bearers may be configured per terminal.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a terminal and an EPC. If the E-RAB is present, the E-RAB bearer and the EPS bearer are mapped in a one-to-one manner. A data radio bearer (DRB) transfers the packet of the EPS bearer between the terminal and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The terminal binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The terminal stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A terminal may have one default bearer or one or more dedicated bearers per PDN. The least default bearer having an EPS session with respect to one PDN is called a default bearer.

The EPS bearer may be classified based on an identity. The EPS bearer identity is allocated by a terminal or an MME. The dedicated bearer(s) is combined with a default bearer by a linked EPS bearer identity (LBI).

When a terminal is initially attached to a network through an initial attach procedure, it receives an IP address allocated thereto and thus a PDN connection is generated. A default bearer is generated at the EPS interval. The default bearer is maintained without being released unless the PDN connection with the terminal is terminated although there is no traffic between the terminal and a corresponding PDN. When the corresponding PDN connection is terminated, the default bearer is also released. In this case, all of bearers in the interval forming a default bearer with the terminal are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a terminal uses a service (e.g., Internet) through a default bearer, if the terminal uses a service (e.g., video on demand (VoD)) insufficient to receive quality of service (QoS) using only the default bearer, a dedicated bearer when the terminal demands the dedicated bearer. If there is no traffic of the terminal, the dedicated bearer is released. A terminal or a network may generate a plurality of dedicated bearers, if necessary.

An IP flow may have a different QoS characteristic depending on that a terminal uses which service. When a network establishes/modifies an EPS session for the terminal, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a terminal. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a terminal via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a terminal uses a service through a default bearer, if the terminal uses a service incapable of receiving QoS using only the default bearer, a dedicated bearer is generated in response (on-demand) to a request from the terminal.

Figure 16:
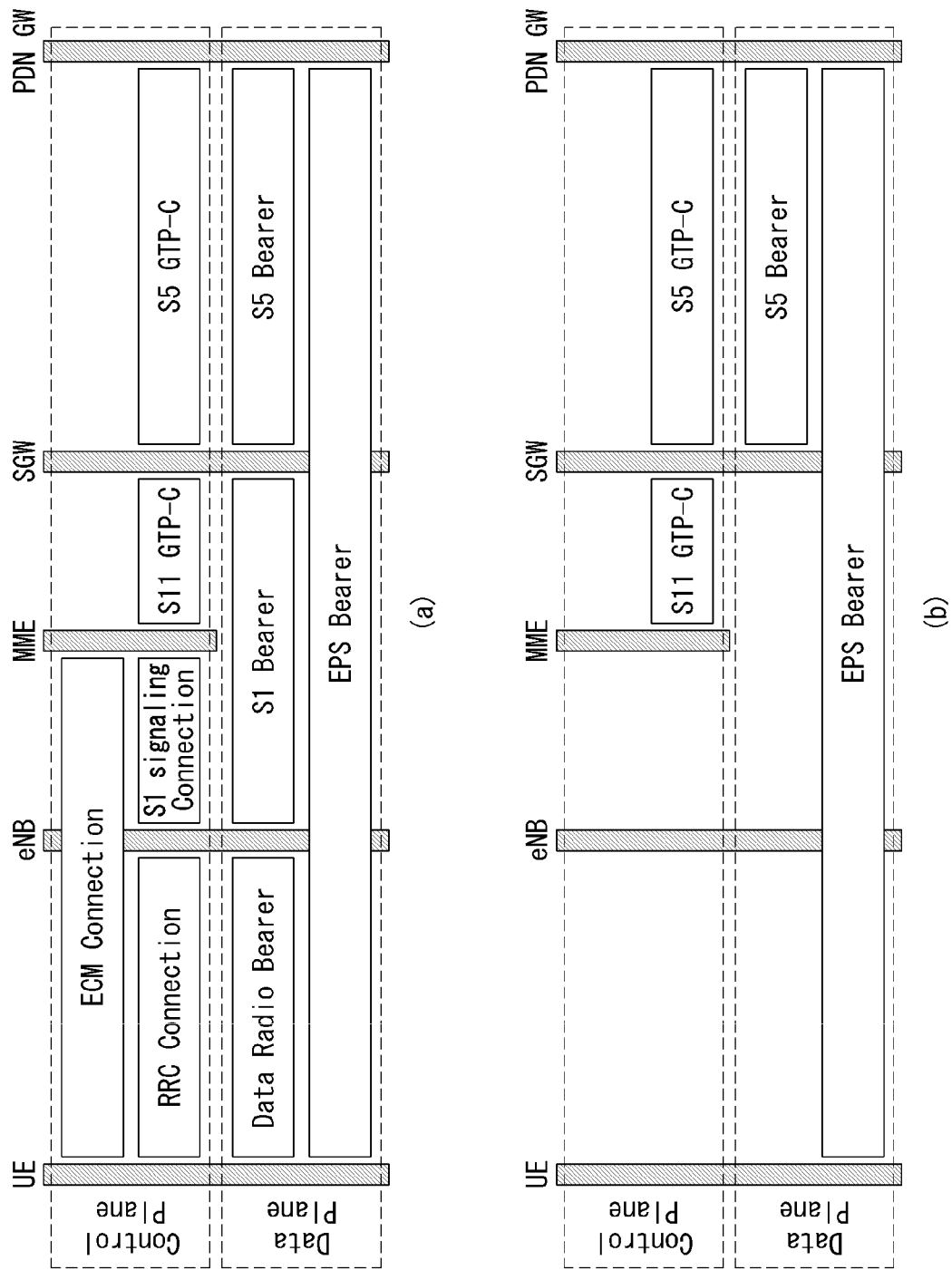
FIG. 16 is a diagram illustrating the transmission path of a control plane and a user plane in an EMM registration state in a wireless communication system to which the present invention may be applied.

FIG. 16 is a diagram illustrating the transmission path of a control plane and a user plane in an EMM registration state in a wireless communication system to which the present invention may be applied.

FIG. 16(a) illustrates an ECM-CONNECTED state, and FIG. 16(b) illustrates ECM-IDLE.

When a terminal becomes the EMM-Registered state by successfully attaching to a network, it is provided with a service using an EPS bearer. As described above, the EPS bearer is divided into a DRB, an S1 bearer, and an S5 bearer for each interval.

As in FIG. 16(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 16(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

Figure 17:
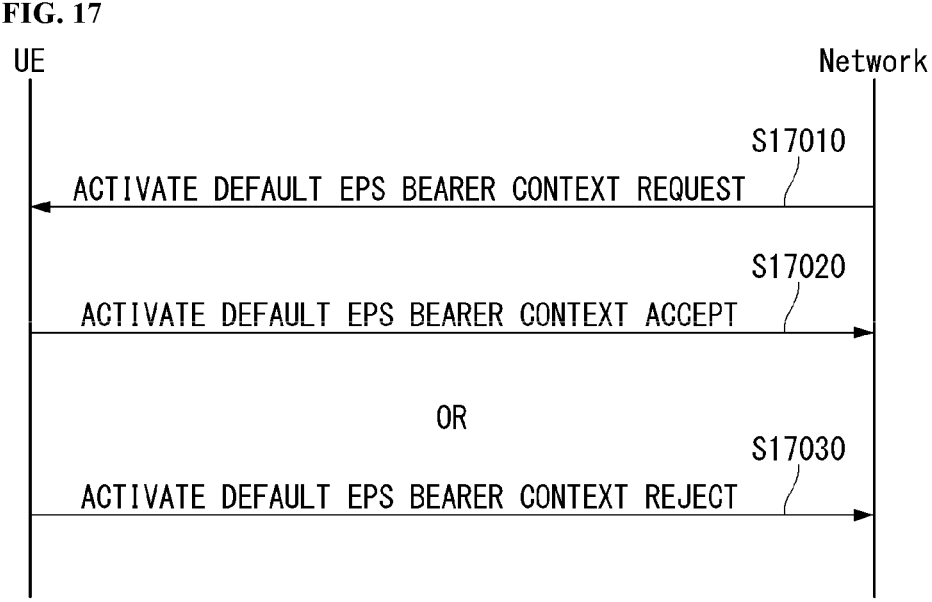
FIG. 17 is a diagram showing an example of a default bearer activation procedure.

FIG. 17 is a diagram showing an example of a default bearer activation procedure.

Referring to FIG. 17, the mobility management entity (MME) transmits an ACTIVATE DEFAULT EPS BEARER CONTEXT REQUEST message in order to initiate a default bearer context activation procedure, and enters a bearer context activation pending state (S17010).

When a default bearer is activated, the MME transmits ATTACH ACCEPT along with the ACTIVATE DEFAULT EPS BEARER CONTEXT REQUEST message and does not start a T3485 timer.

If the default bearer is activated as a response to a stand-alone PDN CONNECTIVITY REQUEST message as part of an attach procedure, the MME transmits the ACTIVATE DEFAULT EPS BEARER CONTEXT REQUEST message and drives the T3485 timer.

The MME may allocate an EPS bearer identity and include the EPS bearer identity in the ACTIVATE DEFAULT EPS BEARER CONTEXT REQUEST message.

The MME may obtain a PTI from the PDN CONNECTIVITY REQUEST message and include the PTI in the ACTIVATE DEFAULT EPS BEARER CONTEXT REQUEST message.

A network identity part and an operator identity part may be included in an Access Point Name IE.

After receiving the ACTIVATE DEFAULT EPS BEARER CONTEXT REQUEST message, a UE may stop the T3396 timer that operates for the APN of the message, transmits an ACTIVATE DEFAULT EPS BEARER CONTEXT ACCEPT message and enters a BEARER CONTEXT ACTIVE state (S17020).

If the default bearer is activated as part of the attach procedure, the UE may transmit an ATTACH COMPLETE message along with the ACTIVATE DEFAULT EPS BEARER CONTEXT ACCEPT message.

If the default bearer is activated as a response to the stand-alone PDN CONNECTIVITY REQUEST message, the UE may transmit the ACTIVATE DEFAULT EPS BEARER CONTEXT ACCEPT message.

If a WLAN offload indication information element is included in the ACTIVATE DEFAULT EPS BEARER CONTEXT REQUEST message, the UE may store WLAN offload acceptability values for a PDN connection, and may use the E-UTRAN offload acceptability values in order to determine whether a connection with a WLAN will be offloaded.

The UE may check the PTI of the ACTIVATE DEFAULT EPS BEARER CONTEXT REQUEST message in order to check whether the UE that has requested the PDN connection procedure is related to the default bearer context activation.

After receiving the ACTIVATE DEFAULT EPS BEARER CONTEXT ACCEPT message, the MME enters a BEARER CONTEXT ACTIVE state. If the T3485 timer operates, the MME may stop the T3485 timer.

If the PDN CONNECTIVITY REQUEST message includes a low priority indicator configure as "MS is configured for NAS signalling low priority", the MME may store the NAS signalling low priority indication of default EPS bearer context.

If the default EPS bearer context activation is part of the attach procedure, an ESM sublayer notifies an EMM sublayer of an EMM failure.

If the default EPS bearer context activation is not part of the attach procedure, the UE may transmit the ACTIVATE DEFAULT EPS BEARER CONTEXT REJECT message and enter a BEARER CONTEXT INACTIVE state (S17030).

The ACTIVATE DEFAULT EPS BEARER CONTEXT REJECT message may include an ESM cause indicative of one of the following cause values.
26: insufficient resources;
31: request rejected, unspecified; or
95-111: protocol errors.

After receiving the ACTIVATE DEFAULT EPS BEARER CONTEXT REJECT message, the MME may enter BEARER CONTEXT INACTIVE. If the T3485 timer operates, the MME may stop the T3485 timer.

Figure 18:
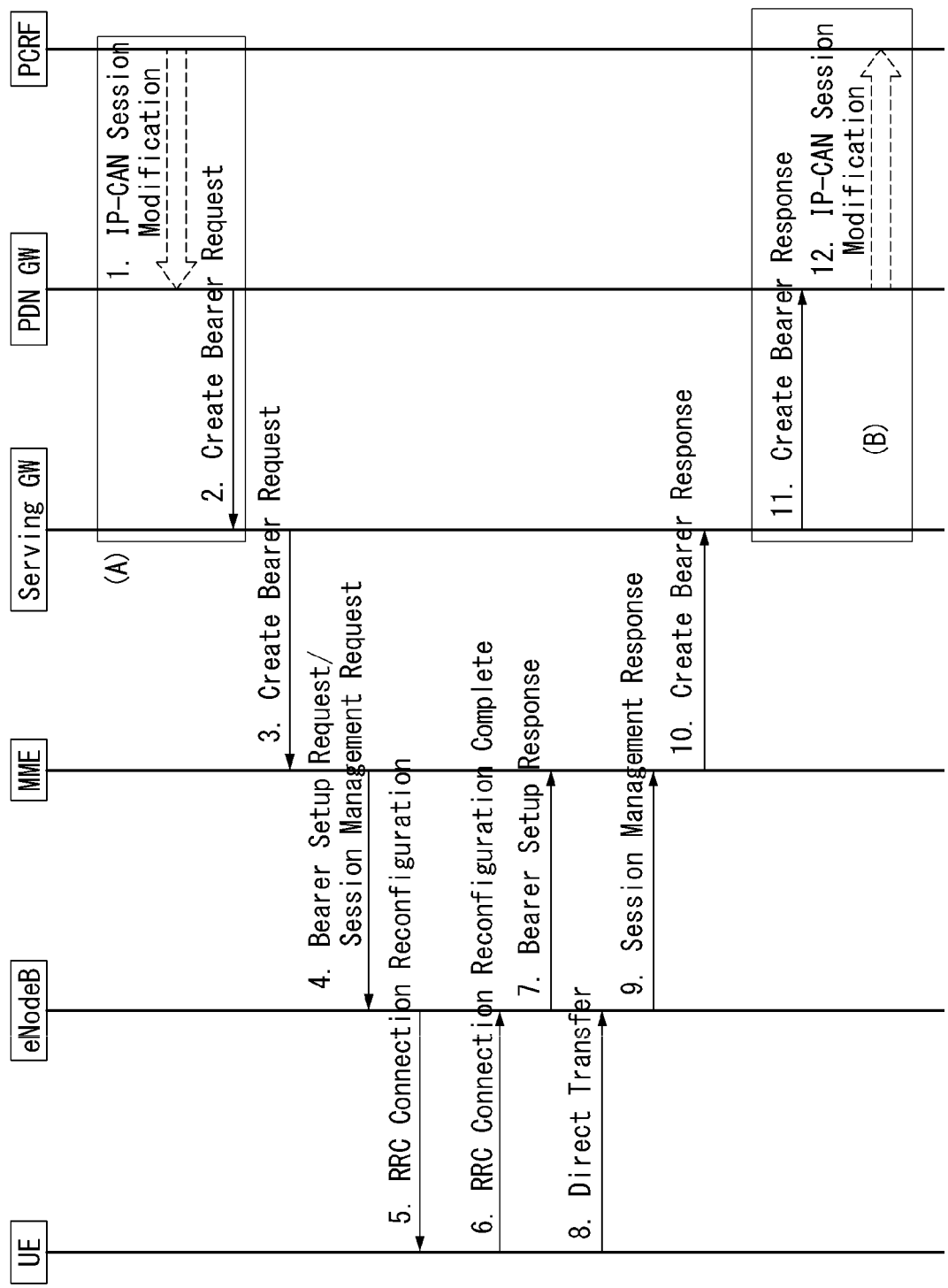
FIG. 18 is a diagram showing an example of a dedicated bearer deactivation procedure.

FIG. 18 is a diagram showing an example of a dedicated bearer deactivation procedure.

FIG. 18 is a flowchart showing a dedicated bearer activation procedure for GPRS Tunneling Protocol (GTP)-based S5/S8.

First, if a dynamic PCC is disposed, the PCRF transmits a PCC decision provision (QoS policy) message to the PDN GW.

Next, the PDN GW transmits a Create Bearer Request message (IMSI, PTI, EPS Bearer QoS, TFT, S5/S8 TEID, Charging Id, LBI, Protocol Configuration Options) for requesting the creation of a bearer to the Serving GW.

Next, the Serving GW transmits a Create Bearer Request (1MSI, PTI, EPS Bearer QoS, TFT, S1-TEID, PDN GW TEID (GTP-based S5/S8), LBI, Protocol Configuration Options) message to the MME.

Next, the MME transmits a Bearer Setup Request (EPS Bearer Identity, EPS Bearer QoS, Session Management Request, S1-TEID) message for requesting a bearer configuration to an eNodeB.

Next, the eNodeB transmits an RRC Connection Reconfiguration (Radio Bearer QoS, Session Management Request, EPS RB Identity) message to a UE.

Next, the UE transmits an RRC Connection Reconfiguration Complete message to the eNodeB in order to notify the eNodeB of radio bearer activation.

Next, the eNodeB transmits a Bearer Setup Response (EPS Bearer Identity, S1-TEID) message to the MME in order to notify the MME of the radio bearer activation in the UE.

Next, the UE transmits a Direct Transfer (Session Management Response) message to the eNodeB.

Next, the eNodeB transmits an Uplink NAS Transport (Session Management Response) message to the MME.

Next, the MME transmits a Create Bearer Response (EPS Bearer Identity, S1-TEID, User Location Information (ECGI)) message to the Serving GW in order to notify the Serving GW of the bearer activation.

Next, the Serving GW transmits a Create Bearer Response (EPS Bearer Identity, S5/S8-TEID, User Location Information (ECGI)) message to the PDN GW in order to notify the PDN GW of the bearer activation.

If a dedicated bearer activation procedure has been triggered by a PCC Decision Provision message from the PCRF, the PDN GW indicates whether a requested PCC decision (QoS policy) has been performed for the PCRF.

Figure 19:
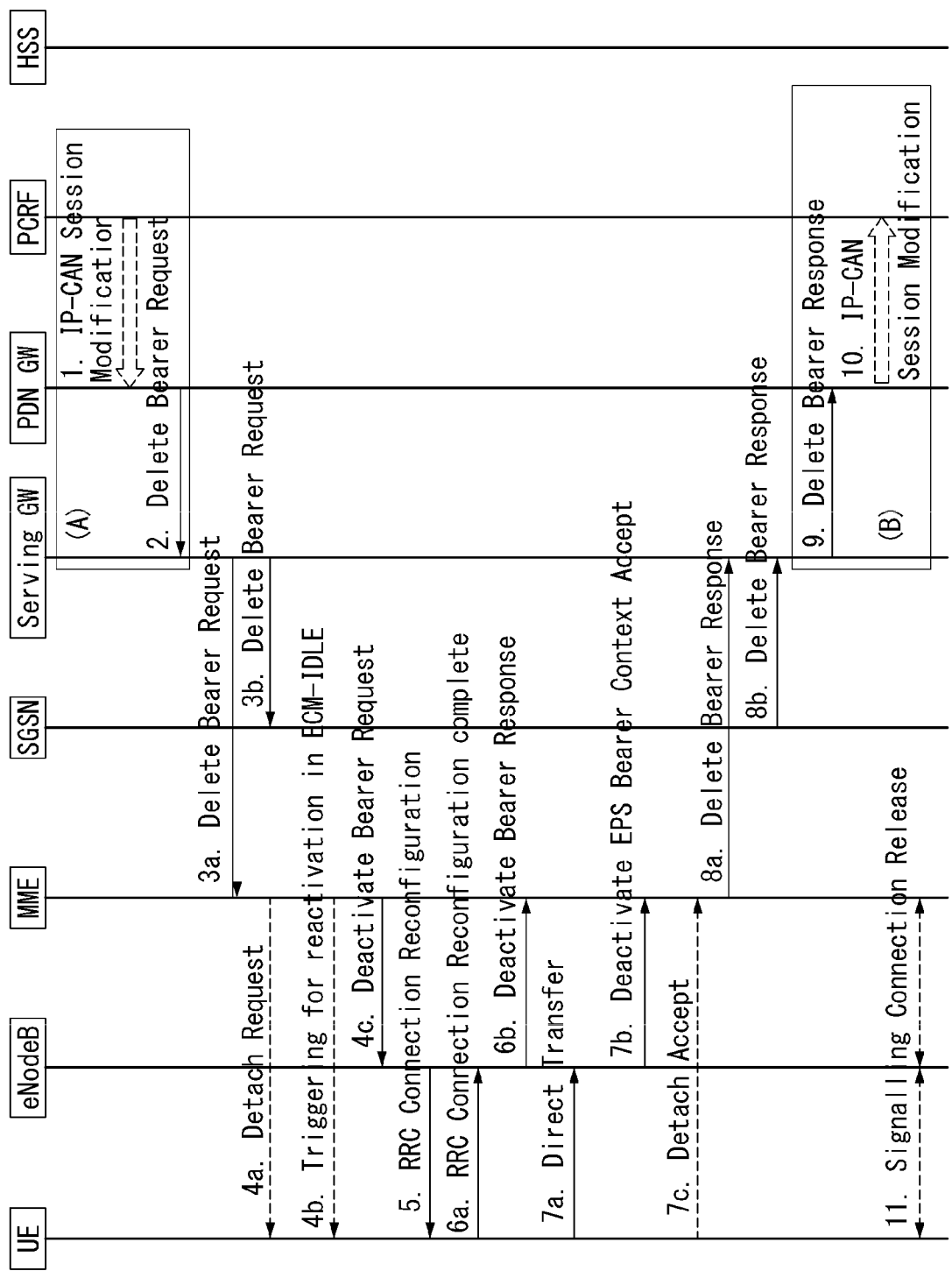
FIG. 19 is a diagram showing an example of a dedicated bearer deactivation procedure.

FIG. 19 is a diagram showing an example of a dedicated bearer deactivation procedure.

FIG. 19 is a flowchart showing a dedicated bearer deactivation procedure for GPRS tunneling protocol-based S5/S8.

The procedure of FIG. 19 may be used to deactivate a dedicated bearer or to deactivate all of bearers belonging to a PDN address.

If a default bearer belonging to a PDN connection is deactivated, the PDN GW deactivates all of bearers belonging to the PDN connection. For a detailed procedure, reference is made to FIG. 18.

Hereinafter, a service (short message service, SMS) for transmitting a short message is described.

The short message service may include the following two basic services:

Short Message Mobile Terminated (SM MT);
Short Message Mobile Originated (SM MO).

SM MT indicates the capability of a GSM/UMTS system for providing information about the transmission of a short message, transmitted by a service centre (SC), as one mobile state (MS) or the transmission of a short message according to a delivery report or failure report along with a specific mechanism for later delivery.

SM MO indicates the capability of a GSM/UMTS system for providing information about the transmission of a short message, transmitted by an MS, to one SME through an SC or the transmission of a short message according to a delivery report or failure report along with a specific mechanism for later delivery. The message may include the address of an SME for allowing the SC to attempt the relay of the short message.

A text message may include a maximum of 140 octets in order for the text message to be transmitted as the means of the SM MT or SM MO.

An active MS may receive a short message TPDU (SMS DELIVER) at any time regardless of whether it is a speech or data call in the procedure. A report may always be returned to the SC.

Specifically, whether the MS has received the short message can be checked, or information about whether the SC cannot transmit the short message TPDU to the MS may be notified along a corresponding cause.

The active MS may submit the short message TPDU at any time regardless of whether it is a speech or data call in the procedure. A report may always be returned to the MS.

Specifically, whether the SC has received the short message TPDU can be checked, or information regarding that the MS cannot transmit the short message TPDU to the SC may be notified.

In a sequence having the same originating address and identity (e.g., message reference number (MO) or SC Timestamp (MT)), two short messages may be received. The reason for this may be an error in which a redundant message or valid new message in the RP or CP layer is generated (e.g., during inter-MCS handover).

A receiving entity may generate a rule for checking other parameters included in the short message in order to discard a second short message.

Figure 20:
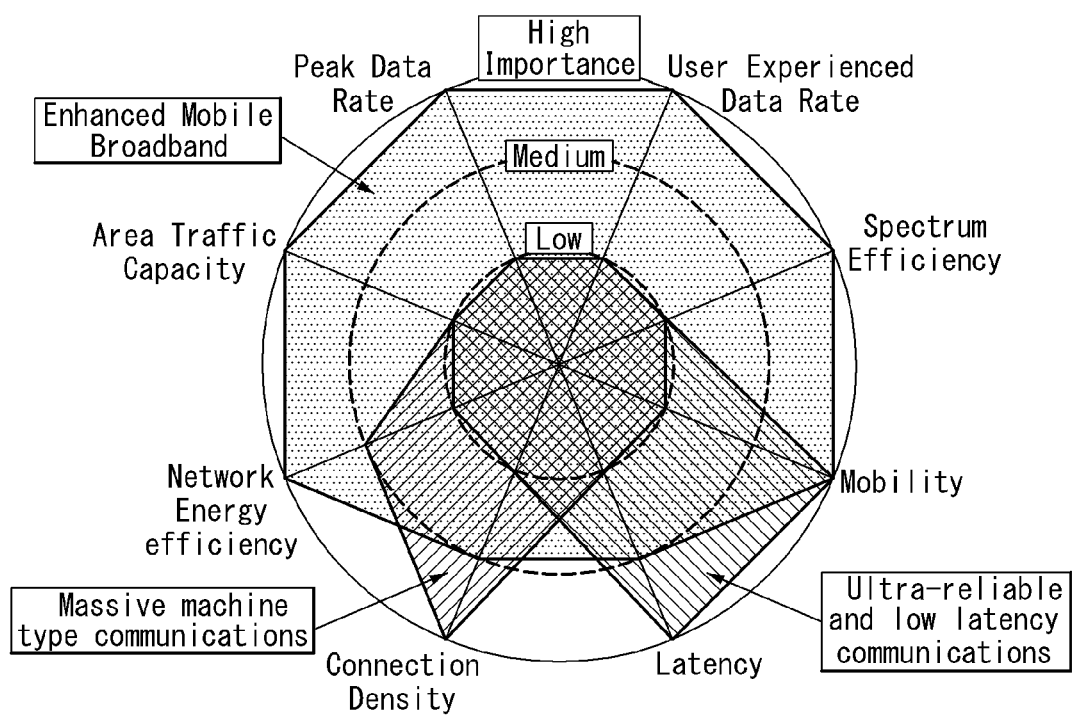
FIG. 20 is a diagram showing an example of the type and requirements of 5G service.

FIG. 20 is a diagram showing an example of the type and requirements of 5G service.

Referring to FIG. 20, 5G service may be basically divided into an "Enhanced Mobile Broadband" that requires the transmission/reception of a large amount of data, "Massive Machine type Communication" that requires a large terminal connection, and "Ultra-reliable and Low latency Communication" that requires high-reliability and low latency.

Such services may include a service having the following characteristics and requirements. It is assumed that data transmission and the reception of a response thereto may be performed within a defined E2E delay time.

Broadcast-Like Service

The present service type includes communication scenarios of traffic congestion information.

Regional emergency warnings include disaster warning. Unlike in the legacy broadcast service, a feedback channel may be used for the track transmission of a waning message for all of or selected parties.

Food and/or medicine recall information (necessary to check whether a handling store needs to receive it)

National or even continental/world-reach services show an interest in a broadcast service for a radio or TV as a substitute or supplement. Furthermore, vertical industries, medical equipment or electronic bikes may receive firmware distribution/update from national broadcast like services. The vehicle industry may use the acknowledgement broadcast capability in order to reduce the necessity of recall campaigns.

This requires the provision of a large-size patch of software, the successful check of update, and documented through a feedback channel.

Table 3 is a table showing an example of requirements for providing Broad-like Services.

TABLE 3

| No. 14 | Broadcast like services | |
|---|---|---|
| Main Attributes | Requirement KPI | Notes |
| User Experienced Data Rate (also at the cell edge) | DL: up to 200 Mpbs UL: Modest (e.g. 500 kbps) | The maximum data rate can be used e.g. to distribute quickly 4K/8K movies, then cached at the device. Other broadcast like services can require a much lower data rate. |
| E2E latency | <100 ms | |
| Mobility | On demand, 0-500 km/h | |
| Device autonomy | From days to years | Depends on the use case. MTC devices can need several years of autonomy |
| Connection Density | Not relevant | |
| Traffic Density | Not relevant | |

Such Broad-like Services are different in common service companies (e.g., logistics companies, hospitals, and traffic systems) and companies providing the Broadcast-like Services (e.g., device fabrication companies and governmental institutes). In the Broad-like Services, data is not consistently generated, but is generated like an event.

Furthermore, since a bearer configuration and maintenance for providing the Broad-like Services increase overhead within a network and has a bad influence on user quality, a terminal may not previously configure a bearer for providing such Broad-like Services.

Accordingly, the aforementioned procedure of configuring a data bearer and session must be performed whenever data for providing the Broad-like Services is generated. Accordingly, transmission latency may occur.

However, as shown in Table 3, the Broad-like Services have a restriction that data must be transmitted to devices of a specific group within 100 ms (including devices in the idle state in addition to the connected state) and a response thereto must be received.

Public Safety Service

Public safety organizations require improved security communication.

For example, this may include the ability for the transmission of real-time video or high-quality photos.

A main challenge is to guarantee reliable communication in the space that provides emergency service, including some underground areas, such as land, sea, air, the inside of a building, the underground of a building and a subway system.

Furthermore, it requires priority in other traffic (in a shared network with other users) and the ability for direct communication between devices.

Table 4 is a table showing an example of requirements for providing Public Safety Service.

TABLE 4

| No. 13 | Ultra-high availability and reliability | |
|---|---|---|
| Main Attributes | Requirement KPI | Notes |
| User Experienced Data Rate (also at the cell edge) | DL: 10 Mbps UL: 10 Mpbs | Data rate enabling real-time video and data transfers (e.g. maps) |
| E2E latency | 10 ms | |
| Mobility | On demand, 0-500 km/h | |
| Device autonomy | >3 days (standard) Up to several years for some critical MTC services | |
| Connection Density | Not critical | |
| Traffic Density | Potentially high | |

As shown in Table 4, in the Public Safety service, data must be transmitted to a specific target (e.g., a server or a surrounding device) regardless of the state of a transmission device within 10 ms and a response thereto must be received.

However, in such Public Safety service, data is not consistently generated, but is generated like an event. A bearer configuration and maintenance for providing the Public Safety service increase overhead within a network and have a bad influence on user quality. Accordingly, a terminal may previously configure a bearer for providing the Public Safety service.

Accordingly, when data for providing the Public Safety service is generated, there is a problem in that delay may occur because the terminal has to configure a bearer through the above-described bearer configuration process and to transmit data.

Scheduling Unit

Each SRB belongs to a logical channel group "0", and a DRB having characteristics, such as Table 5 below, belongs to one of four logical channel groups.

Table 5 is a table showing an example of QCI characteristics.

Accordingly, there is a problem in that resource allocation for other messages rather than an emergency message may be first performed because an SRB and DRB having different priorities may be included in one logical channel group.

In order to solve such a problem, the present invention proposes a method for generating a bearer for providing a specific service and providing a service.

In particular, if a plurality of terminals needs to receive data for providing a specific service (e.g., Broadcast-like service) from a base station and to transmit specific data (hereinafter, response data) to the base station as a response thereto, there is proposed a method of configuring a dedicated path or dedicated bearer (hereinafter, non-EPS data bearer (NDB)) which may be delivered to the base station earlier than a common control message (e.g., RRC message or NAS message) and common data without a separate data bearer and session configuration.

Furthermore, there is proposed a method for a base station to configure a bearer (hereinafter, a service bearer or a specific bearer) configured in a base station unit other than an EPS bearer configured for each UE in order to transmit response data to a gateway.

TABLE 5

| QCI | Resource Type | Priority Level | Packet Delay Budget | Packet Error Loss Rate | Example Services |
| --- | --- | --- | --- | --- | --- |
| 1 | GBR | 2 | 100 ms | 10-2 | Conversational Voice |
| 2 | | 4 | 150 ms | 10-3 | Conversational Video (Live Streaming) |
| 3 | | 3 | 50 ms | 10-3 | Real Time Gaming |
| 4 | | 5 | 300 ms | 10-6 | Non-Conversational Video (Buffered Streaming) |
| 65 | | 0.7 | 75 ms | 10-2 | Mission Critical user plane Push To Talk voice (e.g., MCPTT) |
| 66 | | 2 | 100 ms | 10-2 | Non-Mission-Critical user plane Push To Talk voice |
| 5 | Non-GBR | 1 | 100 ms | 10-6 | IMS Signalling |
| 6 | | 6 | 300 ms | 10-6 | Video (Buffered Streaming), TCP-based (e.g., www, e-mail, chat, ftp, p2p file sharing, progressive video, etc.) |
| 7 | | 7 | 100 ms | 10-3 | Voice, Video (Live Streaming), Interactive Gaming |
| 8 | | 8 | 300 ms | 10-6 | Video (Buffered Streaming), TCP-based (e.g., www, e-mail, chat, ftp, p2p file, sharing, progressive video, etc.) |
| 9 | | 9 | | | |
| 69 | | 0.5 | 60 ms | 10-6 | Mission Critical delay sensitive signalling (e.g., MC-PTT signalling) |
| 70 | | 5.5 | 20 ms | 10-6 | Mission Critical Data (e.g. example services are the same as QCI 6/8/9) |

That is, two SRBs having different characteristics (priorities) belong to the same group. A DRB and an SRB may belong to the same group although they have different characteristics.

A logical channel group becomes a unit for reporting a radio resource request and buffer state.

In the conventional system, a short message is transmitted through the SRB 2. Accordingly, a base station treats the SRB 2 like other DRB or SRB having the same logical channel group and allocates a radio resource according to a scheduling method.

Furthermore, in a core network, an emergency message is treated like a common short message.

The NDB is a bearer not belonging to the above-described EPS bearers, and means a logical path for transmitting/receiving response data for data for providing a specific service different from that of an SRB or a DRB belonging to the EPS bearer.

Furthermore, the service bearer means a bearer configured in a base station unit between a base station and a gateway other than the EPS bearer configured in the existing terminal.

In the present invention, the base station, mobility management entity (MME) and gateway (GW) are entities in which a function necessary to provide the specific service has been implemented, and have been described as an example. Accordingly, the present invention does not limit the entity in which the corresponding function has been implemented to the base station.

Figure 21:
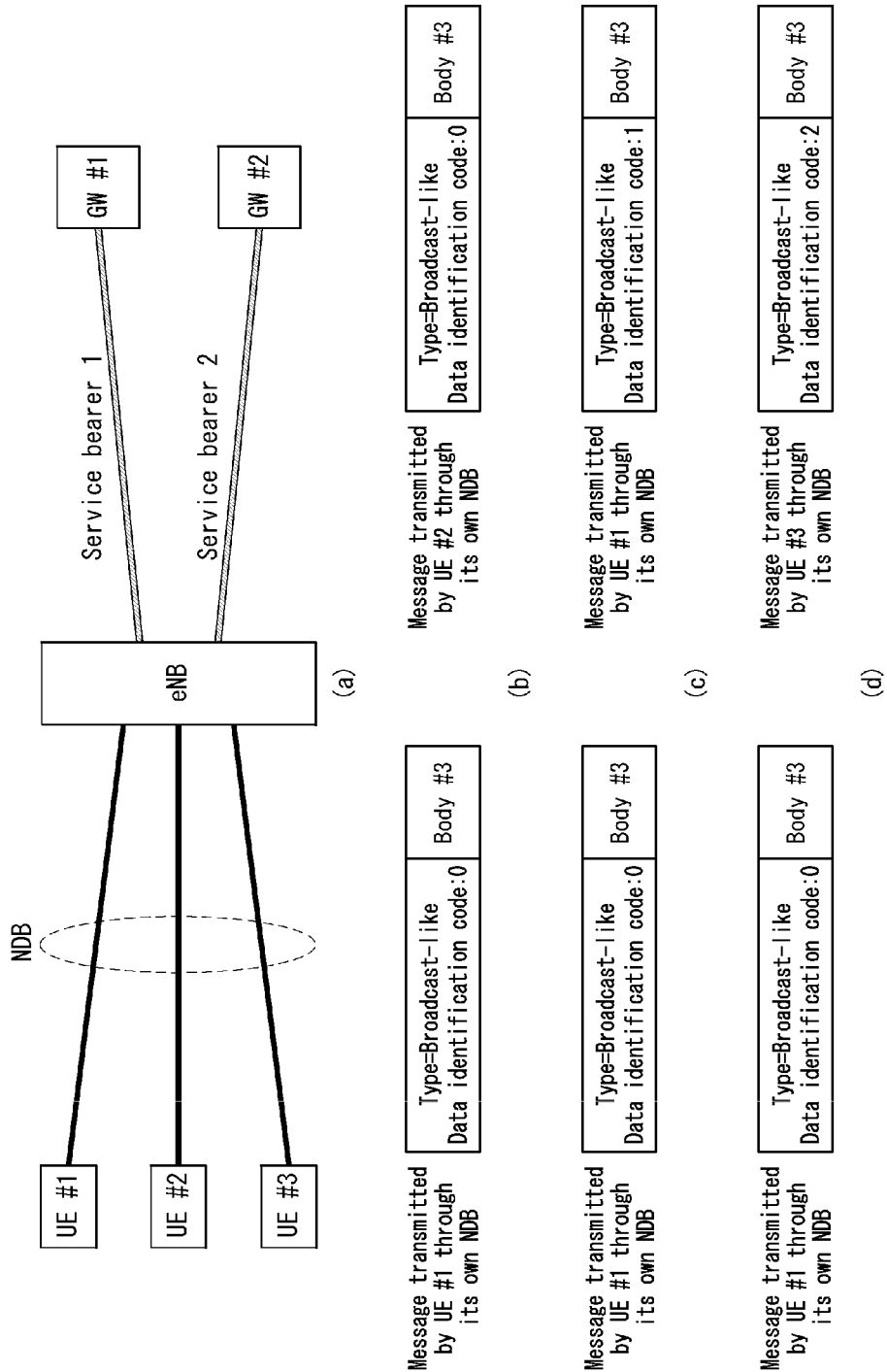
FIG. 21 is a diagram showing an example of a bearer structure in a wireless communication system to which the present invention may be applied.

FIG. 21 is a diagram showing an example of a bearer structure in a wireless communication system to which the present invention may be applied.

Referring to FIG. 21, an NDB for transmitting/receiving data for providing the above-described specific service (e.g., Broadcast-like service) may be configured in a UE unit between a UE and an eNB, and a service bearer may be configured in an eNB unit in order to transmit the data according to a service type between the eNB and a gateway.

In particular, the service bearer generated between the eNB and the gateway may be generated if the UE needs to receive data for providing the specific service and to transmit a response to the data to the gateway.

Specifically FIG. 21(a) shows a bearer structure between a UE and an eNB and between the eNB and a gateway. The above-described NDB is configured in a UE unit between the UE and the eNB.

The NDB means a logical path between the UE and the eNB for transmitting/receiving the data of the specific service, and is different from an SRB and a DRB belonging to an EPS bearer.

In FIG. 21(a), a UE #1, a UE #2, and a UE #3 are connected to the eNB through respective NDBs.

In the present invention, the configuration occasion of the NDB is as follows.

a configuration simultaneously with an RRC connection configuration (a message including configuration information: RRC Connection Setup message)

right after an AS security configuration is completed (a message including configuration information: RRC Connection Reconfiguration)

right after specific service data is generated (a request message: a message including an NDB Request and configuration information: RRC Connection Reconfiguration)

Furthermore, the above-described service bearer is configured between the eNB and the gateway. The service bearer is a bearer configured for the eNB and the gateway to transmit/receive response data for providing the specific service and is not a bearer configured in a UE unit, but is a bearer configured in an eNB unit.

The service bearer may be configured according to a provided service. That is, a different service bearer may be configured depending on the type of service and quality characteristics. Data for providing the same service may be transmitted to the gateway through the same service bearer although the eNB has received the data from different UEs.

In FIG. 21(a), the eNB is connected to a GW #1 and a GW #2 through respective service bearers.

Hereinafter, a method of transmitting data through the bearer described in FIG. 21(a) by taking an example of the Broadcast-like service as a specific service is described with reference to FIGS. 21(b) to 21(d).

First, an eNB may transmit data to a gateway through the same service bearer if received data is data for providing the same service although the eNB has received the data from UEs.

Specifically, in the case of FIG. 21(b), the UE #1 and the UE #2 transmit data to the eNB through respective NDBs. The eNB that has received the data from the UE #1 and the UE #2, respectively, transmits the data to the gateway GW #1 or GW #2 through the same service bearer (service bearer 1 or service bearer 2) because the type of received data is the same as that of Broadcast-like data and identification codes for identifying the data are the same.

Second, an eNB may transmit data to gateways through different service bearers if data received from the same UE has the same type, but has different identification codes for identifying the data.

Specifically, in the case of FIG. 21(c), the UE #1 transmits data to the eNB through its own NDB. The eNB that has received the data from the UE #1 transmits the data to the gateways GW #1 and GW #2 through different service bearers (e.g., an identification code 0 through the service bearer 1 and an identification code 1 through the service bearer 2) because the type of received data is the same as Broadcast-like data, but identification codes are differently 0 and 1.

Third, an eNB may transmit data to a gateway through the same service bearer although data received from UEs has the same type, but has different identification codes.

Specifically, in the case of FIG. 21(d), the UE #1 and the UE #3 transmit data to the eNB through respective NDBs. The eNB that has received the data from the UE #1 and the UE #3, respectively, may transmit the data to the gateway GW #1 or GW #2 through the same service bearer (service bearer 1 or service bearer 2) if the received data has the same quality characteristics although it has the same type as Broadcast-like data and has different identification codes 0 and 2.

Data may be transmitted/received by configuring an NDB, that is, a bearer of a UE unit for transmitting a message, between the UE and the eNB and configuring a service bearer, that is, a bearer of an eNB unit, between the eNB and the gateway through the method shown in FIG. 21.

Figure 22:
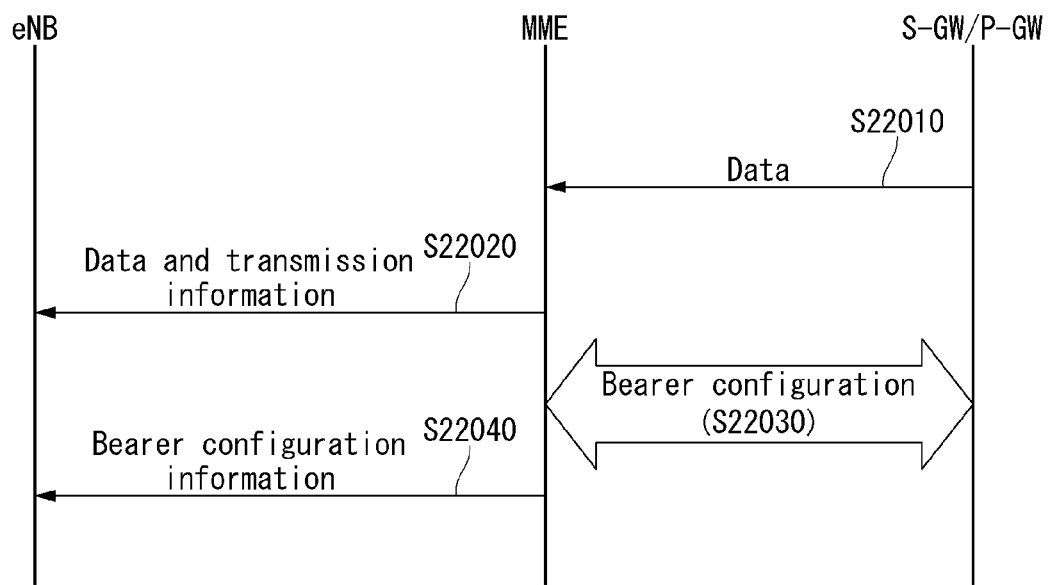
FIG. 22 is a diagram showing an example of a method for configuring a bearer in a wireless communication system to which the present invention may be applied.

FIG. 22 is a diagram showing an example of a method for configuring a bearer in a wireless communication system to which the present invention may be applied.

Referring to FIG. 22, when data for providing a specific service is received, a gateway or a mobility management entity (MME) may determine whether a response to the data is necessary, may configure the above-described service bearer between a UE and the gateway, and may transmit a response to the data from the UE to the gateway through the configured service bearer.

Specifically, the MME may receive specific data for providing a specific service (e.g., Broadcast-like service) and information for transmitting the data from a gateway (P-Gateway, S-Gateway) (S22010).

In this case, the information may include reception UE information indicative of one or more UEs that will receive the specific data, an indicator indicating whether a response of the UE to the specific data is necessary, and the ID of a configured service bearer if the configured service bearer is used if the service bearer has already been configured between the eNB and the gateway.

The reception UE information may include information capable of identifying a UE like a device identity number, such as an international mobile equipment identity (IMEI).

For example, a target UE that will receive the specific data may be determined based on the IMEI configured as in Table 6. Furthermore, as in Table 7, a version, etc. may make the same devices one group, a number according to a group may be designated, and a group that will receive the specific data may be determined.

TABLE 6

| Manufacturing company | Model | Identity number (or serial number) |
| --- | --- | --- |

TABLE 7

| Manufacturing company | Model | Group number |
| --- | --- | --- |

The indicator indicates whether UEs that have received the specific data have to transmit a response to the specific data.

The MME that has received the specific data and information necessary for the transmission may transmit the specific data and the transmission information necessary for the transmission of the specific data to an eNB (S22020).

The transmission information may include reception UE information received from the gateway, an indicator, a bearer ID, the message type and identity code of the specific data, and connection UE information including information of UEs that belong to one or more UEs and that have a connected state with the eNB.

In this case, the connection UE information may include the information of the UEs in the connected state in a list form.

Thereafter, if the indicator indicates that a response to the specific data is necessary and an already configured existing service bearer is not used, the MME and the gateway may perform a procedure for configuring the above-described service bearer (S22030).

In order to configure the service bearer, the MME may transmit a bearer configuration request message that requests the configuration of the service bearer to the gateway, may receive a bearer configuration response message as a response thereto, and may configure the service bearer.

Alternatively, in order to configure the service bearer, the gateway may transmit a bearer configuration request message that request the configuration of the service bearer to the MME, may receive a bearer configuration response message as a response thereto, and may configure the service bearer.

Thereafter, the MME transmits bearer configuration information related to the configured service bearer to the eNB (S22040). The bearer configuration information includes information about a service bearer for transmitting a response to the specific data to the gateway. For example, the bearer configuration information may include a service bearer ID indicative of the service bearer, QoS indicative of the characteristics of data that may be transmitted through the service bearer, type information indicative of the type of message that may be transmitted through the service bearer, identification code information for identifying a message that may be transmitted through the service bearer, the address of a gateway that has been connected through the service bearer, a tunnel ID, and an IP Address to be used upon data transmission.

Through such a process, the service bearer may be configured between the eNB and the gateway. Thereafter, the eNB may transmit data to the gateway through the service bearer even without configuring a separate bearer in each of specific services having the same quality.

Figure 23:
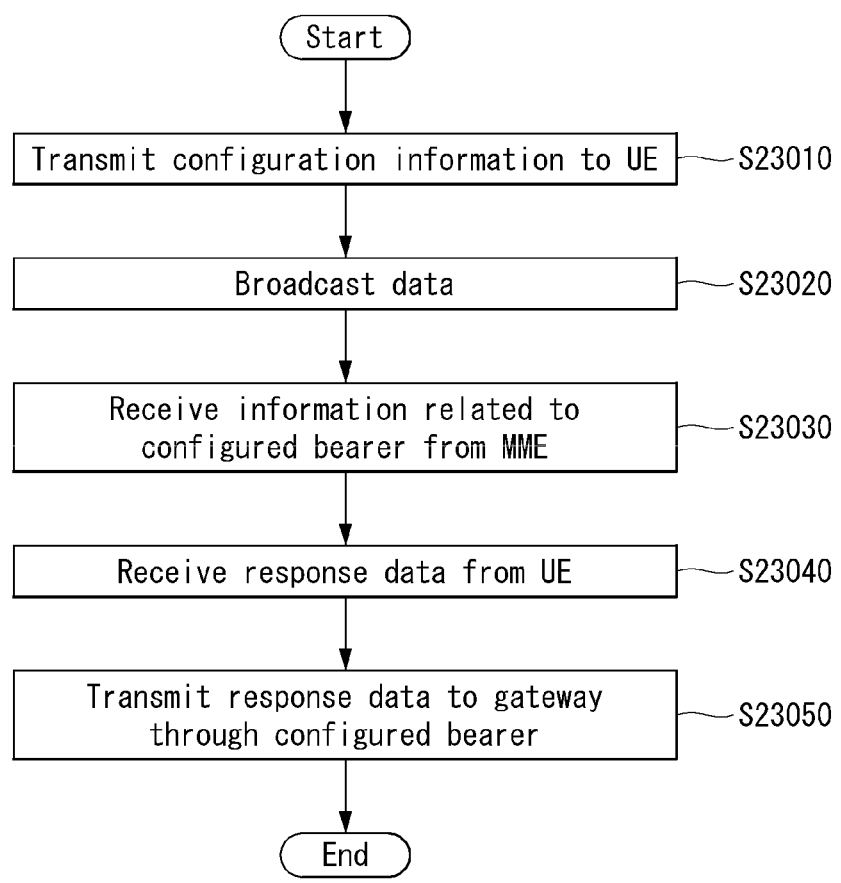
FIG. 23 is a diagram showing an example of a method for transmitting/receiving data through a bearer in a wireless communication system to which the present invention may be applied.

FIG. 23 is a diagram showing an example of a method for transmitting/receiving data through a bearer in a wireless communication system to which the present invention may be applied.

Referring to FIG. 23, an eNB may transmit data, received from a gateway, to a UE, and may transmit a response to the data from the UE to the gateway through the service bearer described in FIG. 22.

Specifically, the eNB may receive data (hereinafter, specific data) for providing a specific service and the transmission information described in FIG. 22 from an MME.

Thereafter, the eNB broadcasts configuration information for transmitting the specific data to UEs within coverage (S23010).

The configuration information may include information for transmitting the specific data. For example, the configuration information may include reception UE information, an indicator, transmission interval information indicative of the interval in which the specific data is transmitted, transmission cycle information of the specific data, a wireless network identity for identifying a resource region including the specific data, resource region information in which the specific data is transmitted, MCS information, message type information of response data if a response to the specific data is necessary, identification code of the specific data, an uplink resource allocation indicator indicating whether an uplink resource for transmitting the response data of the specific data will be allocated to UEs in the connected state without a separate request from the UE, or resource allocation time information indicative of the time when the uplink resource may be allocated if the uplink resource is allocated without a separate request.

The transmission interval information may include information related to the time when the specific data may be transmitted. For example, the transmission interval information may include time information of the starting point and time information of the finishing point of the interval in which the specific data may be transmitted.

The UE may predict the time when the specific data is transmitted through the transmission interval and the transmission cycle information.

The wireless network identity indicates information for identifying whether the specific data transmitted to the UE through the eNB is data transmitted to the UE. For example, the CRC of a PDCCH indicative of the resource region in which the specific data is transmitted may be masked with a wireless network identity (e.g., C-RNTI). The UE may check whether the specific data is data transmitted to the UE by comparing a received identity with the masked identity.

The wireless network identity may be valid only in the interval in which the specific data is transmitted and may be released after the interval.

The resource region information is information indicative of the location of the resource in which the specific data is transmitted and may be included if the resource region of the specific data is not indicated in a PDCCH, and may be released after the transmission interval of the specific data.

The message type information may be used to determine whether a response message will be transmitted through which service bearer if the eNB transmits the response message to the gateway through the service bearer, and may be valid after a specific time from the transmission interval of the specific data.

In this case, the specific time may be previously set or may be included and configured in the configuration information.

The identity code may be used to identify whether the response data from the UE is a response to which data or data for providing which service. The eNB may determine whether or not to transmit the response data to the gateway through which service bearer based on the identity code.

The configuration information may be transmitted through a paging message, a system information block or a notification message because there a UE in the idle state in addition to a UE in the connected state may be present within coverage. The configuration information may be repeatedly transmitted during a specific time.

Thereafter, the eNB may broadcast the specific data to the UEs within the coverage every transmission cycle during the transmission interval. The UEs may determine whether the transmitted specific data is data transmitted thereto based on the wireless network identity, and may receive the specific data (S23020).

If a response from the UE to the specific data may need to be transmitted, the MME and the gateway may configure a service bearer through the method described in FIG. 22. After the configuration of the service bearer is completed, the MME transmits bearer configuration information related to the configured service bearer to the eNB (S23030).

The bearer configuration information includes information about the service bearer for transmitting a response to the specific data to the gateway. For example, the bearer configuration information may include a service bearer ID indicative of the service bearer, QoS indicative of the characteristics of data that may be transmitted through the service bearer, message filtering information (e.g., a message type, an identity code, a transmission/reception IP address, and a port number) indicative of a message that may be transmitted/received through the service bearer, the address of a gateway connected through the service bearer, a tunnel ID, and an IP Address used when the response data is transmitted.

Thereafter, the eNB may receive response data for the specific data from the UE (S23040), and may transmit the response data to a corresponding gateway through the service bearer (S23050).

In this case, if the UE is in the connected state, the response data may be transmitted to the eNB through the above-described NDB.

The steps described in FIG. 23 may be performed without being limited to the sequence of the step. For example, in FIG. 23, step S23030 is an operation between the eNB and the MME, steps S23010 and S23020 are operations between the eNB and the UE, and such operations may be independently performed. Accordingly, step S23030 may not be essentially located between step S23020 and step S23040. That is, step S23030 may be performed prior to step S23020.

Figure 24:
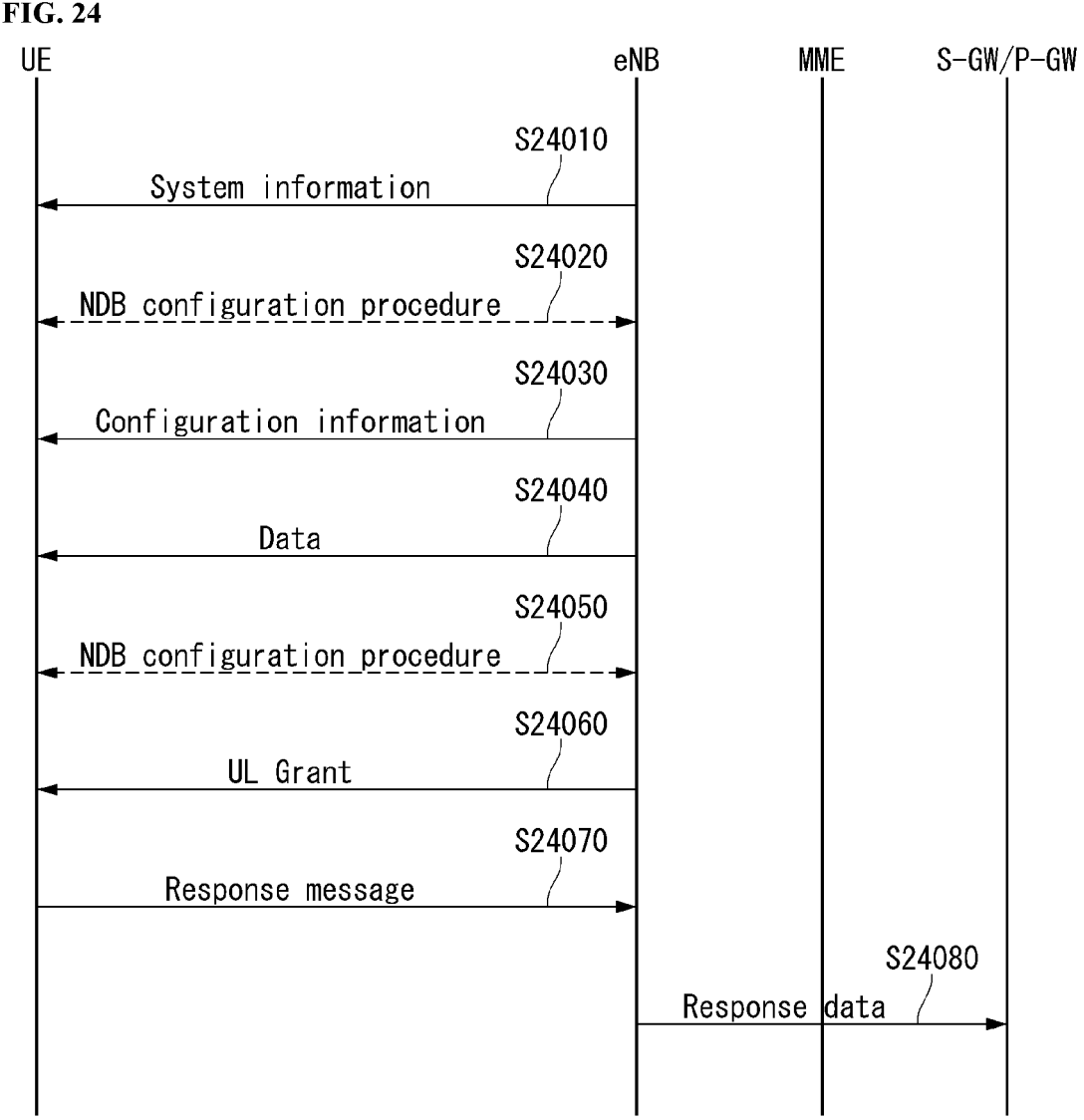
Figure 25:
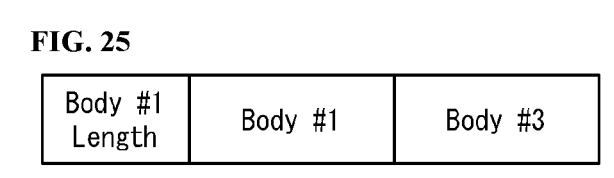

FIGS. 24 and 25 are diagrams showing examples of a method for a UE in the connected state to transmit/receive data through a bearer in a wireless communication system to which the present invention may be applied and a data format.

Referring to FIG. 24, the UE in the connected state may receive specific data for providing a specific service from an eNB, and may transmit response data for the specific data to the eNB without a request for a separate uplink resource or through a request for the separate uplink resource.

Specifically, the UE receives bearer support information indicating whether the eNB supports the above-described non-EPS data bearer (hereinafter, NDB) and a support message type field indicative of the type of message that may be transmitted through the NDB from the eNB.

In this case, the type of message may be statically defined or may be dynamically defined in UEs by the eNB. The bearer support information may be included in a system information block used to transmit/receive the above-described system information (S24010).

The UE that has received the bearer support information may determine whether the eNB supports the NDB.

If the eNB does not support the NDB, the UE performs the existing cell connection and connection state transition (e.g., RRC connection configuration and AS security activation and RRC connection reconfiguration) procedure along with the eNB. If the eNB does not support the NDB, the UE performs an NDB configuration procedure along with the existing procedure with the eNB (S24020).

The UE transmits an RRC connection request message to the eNB in order to establish an RRC connection with the eNB. In this case, the RRC connection request message may include a cause field indicative of the cause for transmitting the RRC connection request.

Thereafter, the UE may receive an RRC connection configuration complete message from the eNB as a response to the RRC connection request message.

If the UE attempts to configure an NDB through the RRC connection procedure along with the eNB, the RRC connection request message may further include an NDB indicator, that is, an indicator indicating whether the UE supports the NDB. The RRC connection configuration message may further include configuration information for an NDB configuration.

In this case, the configuration of the NDB is performed regardless of the cause field of the RRC connection request message. That is, although the cause field does not indicate a specific service, the eNB and the UE may configure the NDB.

The NDB may be generated when an RRC connection procedure between the UE and the eNB is performed although the message of a specific service to be transmitted by the UE is not present, and may be maintained until the RRC connection between the UE and the eNB is disconnected.

Furthermore, a plurality of NDBs may be configured in a UE unit depending on an environment configuration (e.g., RLC mode, Max Retx Threshold, Logical Channel Identity, Priority: Highest priority, Prioritized Bit Rate, quality of service (QoS)) value.

A message transmitted through the NBD may be independently managed in a separate buffer, and is not managed in the above-described logical channel group form so that the buffer state of the separate buffer combined with the buffer of another SRB and/or DRB is not reported.

If the NDB is not configured through the RRC connection procedure, the eNB may initiate an initial security activation procedure (e.g., initial security activation) and configure the NDB by performing an RRC connection reconfiguration procedure.

For example, the eNB may configure the NDB by transmitting an RRC connection reconfiguration message, including SRB2 and configuration information for the NDB configuration, to the UE.

In this case, the UE may notify the eNB that the NDB configuration has been completed through the RRC connection reconfiguration complete message.

The UE in the idle state may make transition to the connected state through the RRC connection configuration and connection reconfiguration procedure.

The UE in the connected state receives the configuration information described in FIG. 23 from the eNB (S24040). The UE may check whether the specific data requires a response and whether an uplink resource is allocated even without a request for a separate uplink resource from the eNB through the configuration information received from the eNB.

The UE may receive the specific data for providing a specific service every transmission cycle in the transmission interval included in the configuration information (S24040).

If the NDB has not been configured through the RRC connection and connection reconfiguration procedure or an NDB previously configured through the procedure has quality different from that of the response data for the specific data, the eNB may perform a procedure for configuring an NDB for transmitting the response data after step S24040 (S24050).

For example, the UE transmits a request message that requests the configuration of the NDB to the eNB.

The eNB that has received the request message transmits an RRC connection reconfiguration message, including the configuration information for the NDB configuration, to the UE. The UE notifies the eNB that the NDB configuration has been completed by transmitting an RRC connection reconfiguration complete message as a response thereto.

Step S24050, that is, a procedure for configuring the NDB, may be performed prior to step S24030. For example, if an indicator indicating whether a response from the UE to the specific data included in the configuration information indicates that a response is necessary, the eNB may perform a procedure for configuring the NDB along with the UE.

If the specific data is data that requires a response and an uplink resource is allocated even without an uplink resource allocation request from the eNB, the UE waits until the uplink resource is allocated and receives the uplink resource allocated thereto (S24060).

However, if an uplink resource is not allocated during the time indicated by resource allocation time information or resource allocation is not performed without an uplink resource request from the eNB, the UE may receive an uplink resource allocated thereto by making an uplink resource allocation request from the eNB.

Thereafter, the UE may transmit a message, including the response data, to the eNB through the allocated uplink resource (S24070). As shown in FIG. 25, the response message may include two body fields and a length field indicative of the length of one first body field (Body #1).

The first body field may include message type information included in the configuration information, and the identity code or wireless network identity of the specific data. The second body field may include response data, that is, a response to the specific data.

In this case, if the NDB is dedicated to a specific service, the message type information may not be included.

The eNB may determine a destination to which the response data included in the second body field needs to be transmitted through information included in the first body field of the response message, and transmits the response data to the determined destination (S24080).

In this case, if the eNB has received the response data of the same destination from a plurality of UEs, it may aggregate the received response data and transmit it to the destination.

Figure 26:
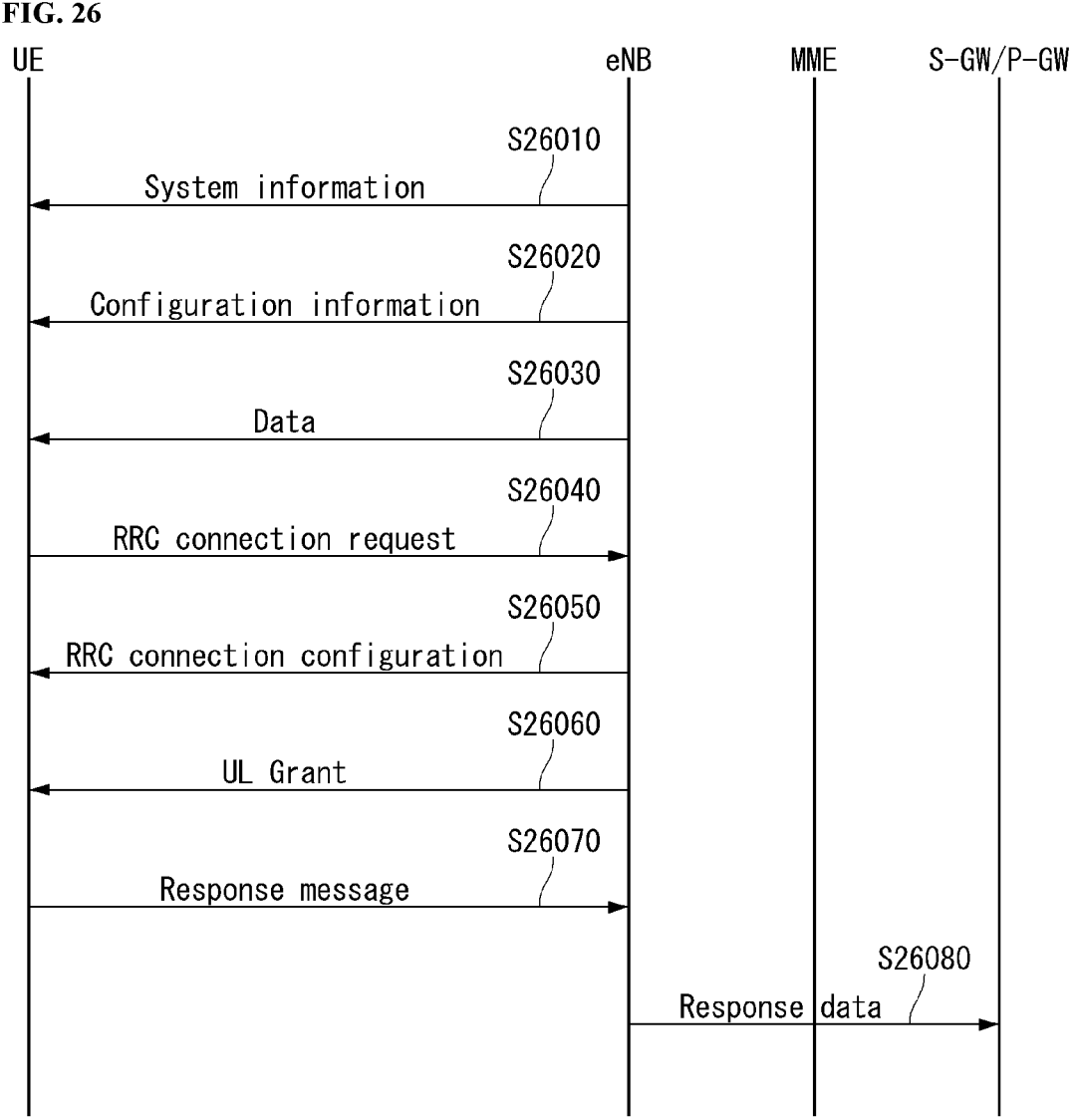
FIG. 26 is a diagram showing an example of a method for a terminal in the idle state to transmit/receive data in a wireless communication system to which the present invention may be applied.

FIG. 26 is a diagram showing an example of a method for a UE in the idle state to transmit/receive data in a wireless communication system to which the present invention may be applied.

Referring to FIG. 26, the UE in the idle state may receive specific data for providing a specific service from an eNB, and may transmit response data for the specific data to the eNB without a request for a separate uplink resource or through a request for a separate uplink resource after an RRC connection.

First, step S26010 is the same as step S24010 of FIG. 24 and thus a description thereof is omitted.

Specifically, the UE may receive the configuration information described in FIG. 23 from the eNB (S26020), and may receive the specific data for providing a specific service every transmission cycle in a transmission interval included in the configuration information (S26030).

In this case, since the UE is the RRC idle state, the configuration information may not include the uplink resource allocation indicator and resource allocation time information for the UE described in FIG. 23.

If the specific information broadcast by the eNB is not data that needs to be received by the UE and the UE recognizes that there is no transmitted or received data, the UE in the idle state sleeps.

However, if the specific data is data that needs to be received by the UE and a response to the specific data is necessary, that is, if an indicator indicates a response, the UE performs a procedure for configuring an NDB along with the eNB in order to transmit response data. FIG. 26 is an embodiment in which an NDB is configure along with an RRC connection procedure.

The UE transmits an RRC connection request message to the eNB in order to establish an RRC connection with the eNB (S26040). In this case, the RRC connection request message may include a cause field indicative of the cause of transmitting the RRC connection request and/or an NDB indicator, that is, an indicator indicating whether the UE supports the NDB.

The cause field may be configured as follows depending on a transmitted message.

common control/data: mt-Access, mo-Signaling, mo-Data existing emergency call service: emergency emergency message service: enhanced emergency or public safety Broadcast-like Service: Broadcast-like Data The present embodiment is for transmitting response data for the specific data, and thus the cause field is configured as Broadcast-like Service.

Thereafter, the UE may receive an RRC connection configuration message, including configuration information for the NDB configuration, from the eNB as a response to the RRC connection request message, and may configure the NDB (S26050).

In this case, the RRC connection configuration message may include the uplink resource allocation indicator and the resource allocation time information.

A plurality of the NDBs may be configured in a UE unit depending on an environment configuration (e.g., RLC mode, Max Retx Threshold, Logical Channel Identity, Priority: Highest priority, Prioritized Bit Rate, quality of service (QoS)) value.

A message transmitted through the NBD may be independently managed in a separate buffer, and is not managed in the above-described logical channel group form so that the buffer state of the separate buffer combined with the buffer of another SRB and/or DRB is not reported.

Thereafter, step S26060 to step S26080 are the same as step S24060 to step S24080 of FIG. 24, and thus a description thereof is omitted.

Figure 27:
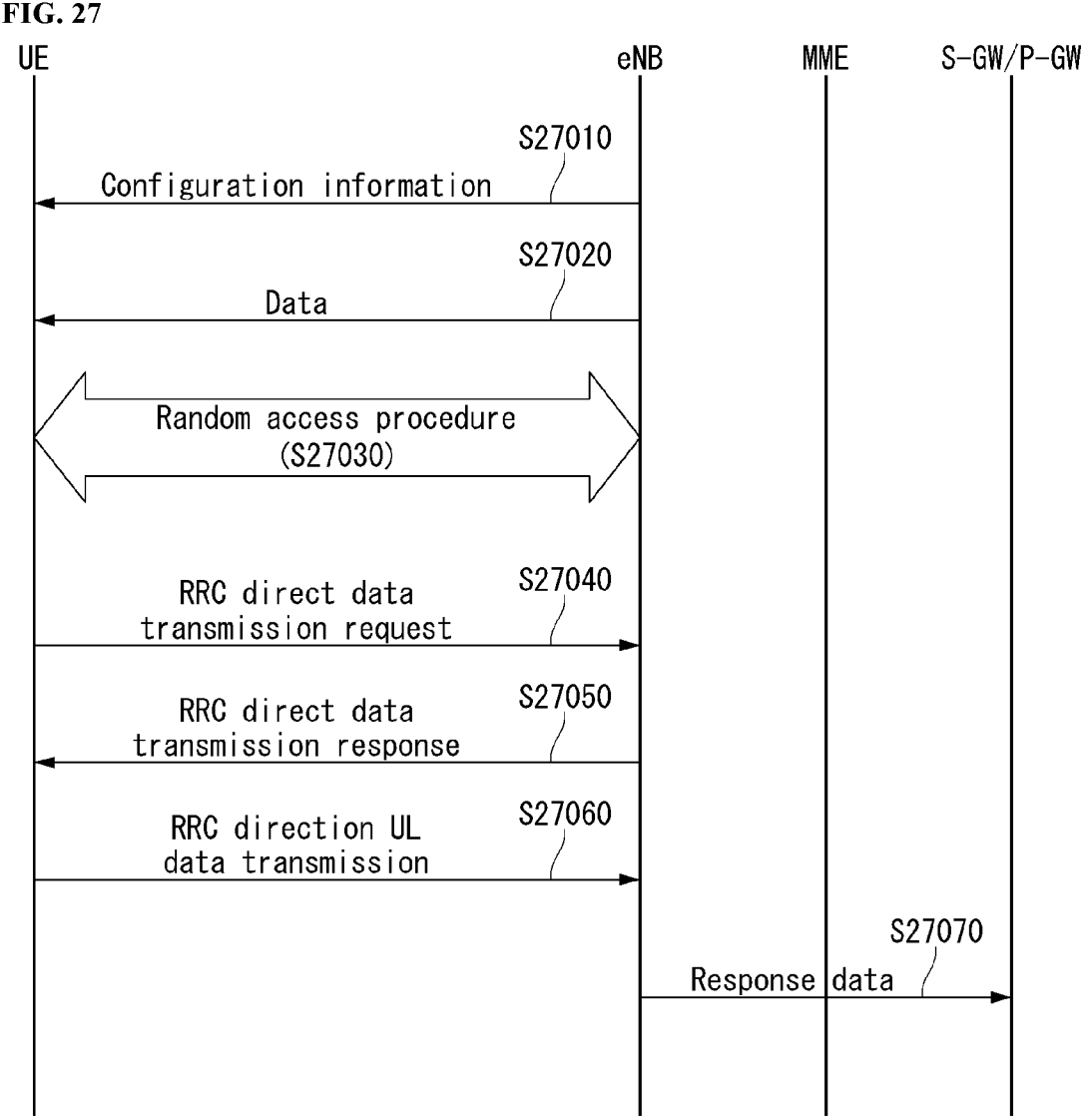
FIG. 27 is a diagram showing another example of a method for a terminal in the idle state to transmit/receive data in a wireless communication system to which the present invention may be applied.

FIG. 27 is a diagram showing another example of a method for a UE in the idle state to transmit/receive data in a wireless communication system to which the present invention may be applied.

Referring to FIG. 27, the UE in the idle state may receive specific data for providing a specific service from an eNB, and may transmit a response to the specific data to the eNB without a separate RRC connection procedure in the idle state.

First, step S27010 and step S27020 are the same as step S26020 and step S26030 of FIG. 26, and thus a description thereof is omitted.

Specifically, the UE performs the random access procedure described in FIG. 13 along with the eNB (S27030). That is, the UE transmits a random access preamble to the eNB. When the random access preamble is received, the eNB transmits a random access response message to the UE. In this case, the random access procedure may be separately designed for the UE attempting to receive a low latency service in the idle state.

Specifically, downlink scheduling information for the random access response message may be CRC-masked with a random access-radio network temporary identifier (RA-RNTI) and transmitted on an L1 or L2 control channel (PDCCH). The UE that has received a downlink scheduling signal masked with the RA-RNTI may receive a random access response message from a physical downlink shared channel (PDSCH) and decode it. Thereafter, the UE checks whether random access response information indicated therefor is included in the random access response message.

Whether random access response information indicated therefor is present or not may be checked by checking whether a random access preamble ID (RAID) for a preamble transmitted by the UE is present or not.

The random access response information includes timing alignment (TA) indicative of timing offset information for synchronization, radio resource allocation information used in the uplink, and a temporary identity (e.g., a temporary C-RNTI) for UE identification.

Thereafter, the UE may transmit a request message (or RRC direct data transfer request message) to the eNB in order to request the transmission of the response data in the idle state (S27040).

The request message may include a message type field indicative of a message type, a UE ID IE field indicative of a UE identity for identifying the UE, a Tx indicator indicating whether the request message is a message for data transmission or a request message for data reception, a quality of service information element (QoS IE) field indicating the characteristics of data to be transmitted if the request message is a request (i.e., uplink low latency service data) for data transmission, and a size field indicative of the size of the response data.

The QoS IE field may include an NDB indicator indicating whether the transmission path of the response data is an NDB, message type information indicative of the type of the response data, and the identity code. The Tx indicator may indicate the transmission of data.

In this case, the message type information may correspond to the message type of the specific data.

The UE ID IE may include an MME identity to manage the UE and an identity to identify the UE within a corresponding MME. More specifically, the UE ID IE may include at least one of a public land mobile network identifier (PLMN ID) that is a network identity number, an MME group identifier (MMEGI) that is a MME group identity, an MME code (MMEC) indicative of an MME code identity, an MME temporary mobile subscriber identity (M-TMSI) indicative of a UE identity, a parameter to identify that an identity is an identity allocated by an MME that supports which communication technology, and a parameter to identify whether an identity is an identity allocated by other entities other than the MME.

If a direct communication path (e.g., S1 interface) is not present between the MME corresponding to the MME identity and the eNB, the eNB may request authentication and context information processing for the UE from another MME. The MME and another MME may exchange context information for the UE.

The eNB may determine a resource allocation time and resource allocation size based on information of the QoS IE field corresponding to the response data to be transmitted by the UE, includes an UL resource IE indicative of the corresponding resource allocation information in a response message (or RRC direct data transfer response message), and transmits the response message to the UE (S27050).

The response message may be included in an RRC message, MAC message or MAC header form and transmitted.

Furthermore, since a plurality of UEs that has selected the same resource and random access code (or preamble) may be present in the random access process, the response message may include a target UE ID IE field indicating that the allocated resource has been allocated to which UE.

The target UE ID IE field may include one or more fields including the UE ID IE received at step S27040.

Table 8 is a table showing an example of the data formats of the response message.

TABLE 8

| Oct 1 | Target UE ID IE |
| Oct 2 | Target UE ID IE |
| Oct 3 | Target UE ID IE |
| Oct 4 | Target UE ID IE |
| Oct 5 | Target UE ID IE |
| Oct 6 | UL Resource IE |
| Oct 7 | UL Resource IE |

The UE transmits a transmission message (or RRC direct uplink data transmission message) to the eNB in order to transmit the response data through a resource allocated through the response message (S27060).

Thereafter, the eNB may determine a destination to which the response data has to be transmitted through the message type information and identity code included in the response message, and transmits the response data to the destination (S27070).

A UE in the idle state can transmit response data for specific data to an eNB even without a separate connection procedure through such a method. The eNB can transmit data to a gateway through a bearer configured for each service other than a bearer configured for each UE.

Figure 28:
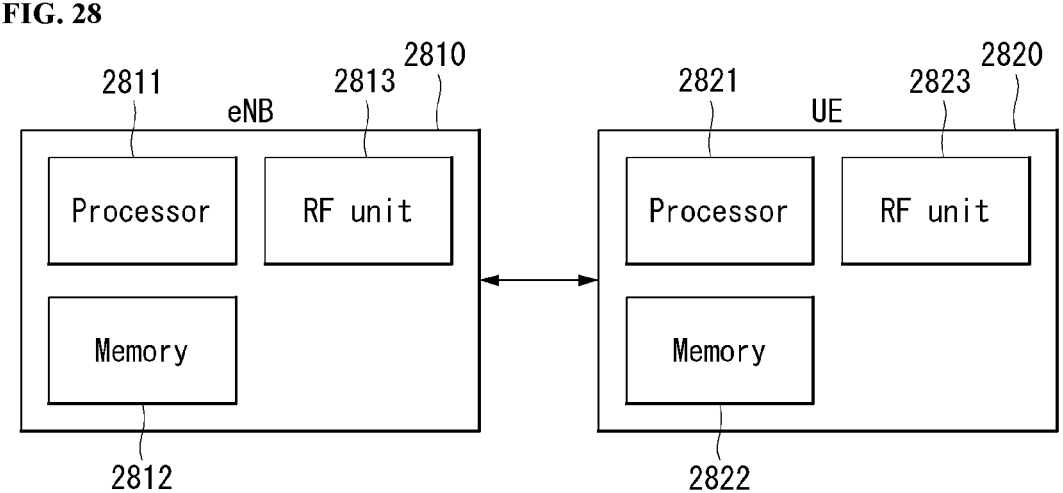
FIG. 28 is a diagram showing an example of an internal block of a wireless apparatus to which the present invention may be applied.

FIG. 28 is a diagram showing an example of an internal block of a wireless apparatus to which the present invention may be applied.

In this case, the wireless apparatus may be an eNB or a UE, and the eNB includes both a macro eNB and a small eNB.

As shown in FIG. 28, the eNB 2810 and the UE 2820 include communication units (transmission/reception units, RF units) 2813 and 2823, processors 2811 and 2821, and memory 2812 and 2822, respectively.

In addition, the eNB and the UE may further include input units and output units.

The communication unit 2813, 2823, the processor 2811, 2821, the input unit, the output unit, and the memory 2812, 2822 are functionally connected in order to perform the methods proposed in this specification.

The communication unit (transmission/reception unit or RF unit) 2813, 2823 moves received information to a radio-frequency (RF) spectrum when infoiniation generated from a physical layer (PHY) protocol is received, performs filtering, amplification, etc., and transmits the information to an antenna. Furthermore, the communication unit performs a function for moving a radio frequency (RF) signal received from the antenna to a band capable of being processed in the PHY protocol and performing filtering.

Furthermore, the communication unit may also include a switch function for switching such a transmission and reception function.

The processor 2811, 2821 implements the functions, processes and/or methods proposed in this specification. The layers of the radio interface protocol may be implemented by the processor.

The processor may be expressed as a control unit, a controller, a control unit or a computer.

The memory 2812, 2822 is connected to the processor and stores a protocol or parameter for performing an uplink resource allocation method.

The processor 2811, 2821 may include application-specific integrated circuits (ASIC), other chipsets, logic circuits and/or data processors. The memory may include read-only memory (ROM), random access memory (RAM), flash memory, memory cards, storage media and/or other storage devices. The communication unit may include baseband circuits for processing radio signals. When an embodiment is implemented in software, the above-described method may be implemented as a module (process, function, etc.) performing the above-described function.

The module may be stored in the memory and executed by the processor. The memory may be located inside or outside the processor and may be connected to the processor by various well-known means.

The output unit (display unit or display unit) is controlled by the processor, and outputs information output by the processor along with a key input signal generated by a key input unit and various information signals from the processor.

The present invention is not limited to the aforementioned embodiments and the accompanying drawings because it may be substituted, modified, and changed in various ways by those skilled in the art to which the present invention pertains without departing from the technical spirit of the present invention.

INDUSTRIAL APPLICABILITY

The RRC connection method in a wireless communication system of the present invention has been illustrated based on an example in which the method is applied to the 3GPP LTE/LTE-A systems, but may be applied to various wireless communication systems in addition to the 3GPP LTE/LTE-A systems.

The invention claimed is:

1. A method for establishing a bearer of a base station for transmitting and receiving data in wireless communication system, the method comprising:
receiving, from a mobility management entity (MME), specific data for a specific service and data transmission information including an indicator indicating whether response data of at least one terminal for the specific data is necessary for a transmission of the specific data, wherein the data transmission information includes at least one of reception terminal information indicating the at least one terminal which will receive the specific data or connection terminal information indicating terminals belonging to the at least one terminal and having a connection state with the base station;
receiving, from the MME, bearer information including information related to a specific bearer for transmitting response data for the specific data, configured between the base station and a gateway; and
transmitting, to the gateway, the response data for the specific data transmitted by one or more terminals through the specific bearer,
wherein the specific bearer is configured if the indicator indicates that the response data is necessary.

2. The method of claim 1, wherein the data transmission information further includes at least one of type information of the specific data or identity code information of the specific data.

3. The method of claim 1, further comprising:
transmitting configuration information for transmitting the specific data to the at least one terminal;
transmitting the specific data to the at least one terminal based on the configuration information; and
receiving a response message including the response data in response to the specific data from the at least one terminal through a dedicated bearer,
wherein the response message is transmitted earlier than a general control message and a general data message.

4. The method of claim 3, wherein the configuration information is periodically transmitted through a paging message, a system information block or a notification message.

5. The method of claim 3, wherein the configuration information includes at least one of the reception terminal information, the indicator, the connection terminal information, transmission interval information indicating an interval in which the specific data is transmitted, transmission cycle information indicating a cycle in which the specific data is transmitted, type information indicating a type of specific data, a wireless network identity for identifying a resource region in which the specific data is included, resource region information indicating a resource region in which the specific data is included, and identity code information for identifying the specific data.

6. The method of claim 5, wherein the response message includes a first body field, a second body field, and a length field indicating a length of the body field.

7. The method of claim 6, wherein:
the first body field includes at least one of the type information, the identity code information, or the identity, and
the second body field includes the response data.

8. The method of claim 3, wherein if a terminal is in a connection state, the configuration information includes a resource allocation indicator indicating whether a resource for the transmission of the response message is allocated to the at least one terminal without receiving, from the at least one terminal, a request for the resource and time information indicating an allocation time of the resource.

9. The method of claim 8, further comprising transmitting resource information indicating the allocated resource to the terminal,
wherein the response message is transmitted through the allocated resource.

10. The method of claim 8, further comprising:
transmitting, to the at least one terminal, an uplink (UL) grant for allocating the resource based on the resource allocation indicator,
wherein the UL grant is transmitted without receiving, from the at least one terminal, the request when the resource allocation indicator indicates the UL grant is transmitted, to the at least one terminal, without receiving the request from the at least one terminal.

11. The method of claim 3, further comprising:
receiving an RRC connection request message to request an RRC connection from a terminal;
transmitting an RRC connection configuration message including configuration information of a dedicated bearer configured between the terminal and the base station and a resource allocation indicator indicating whether a resource for the transmission of the response message has been allocated as a response to the RRC connection request message; and
transmitting resource information indicating the allocated resource to the terminal,
wherein the RRC connection request message includes a cause field indicating an RRC connection request for transmitting/receiving the data of a service, and
the response message is transmitted through the allocated resource.

12. The method of claim 3, further comprising:
receiving a request message to request the transmission of the response message from a terminal; and
transmitting a response message including resource information for transmitting the response message to the terminal,
wherein the response message is transmitted based on the resource information.

13. The method of claim 12, wherein the request message includes at least one of a transmission/reception indicator indicating whether the request message is a message for transmission, a dedicated bearer indicator indicating whether a transmission path of the response message is the dedicated bearer, identity code information indicating a response to the specific data, or type information indicating a type of response data.

14. The method of claim 1, further comprising:
transmitting bearer support information indicating whether a dedicated bearer configured between a terminal and the base station is supported and support message type information indicating a type of message capable of being transmitted through the dedicated bearer in order to provide a service to the terminal; and
configuring the dedicated bearer with the terminal.

15. The method of claim 14, wherein the configuring the dedicated bearer comprises:
receiving an RRC connection request message to request an RRC connection from the terminal; and
transmitting an RRC connection configuration message including configuration information of the dedicated bearer as a response to the RRC connection request message, and
wherein the RRC connection request message includes a cause field indicating an RRC connection request for transmitting/receiving the data of the service.

16. The method of claim 14, wherein the configuring the dedicated bearer comprises:
transmitting an RRC connection reconfiguration message indicating configuration information of the dedicated bearer to the terminal; and
receiving an RRC connection reconfiguration complete message as a response to the RRC connection reconfiguration message.

17. The method of claim 1, wherein the bearer information includes at least one of a bearer ID indicating the bearer, message filtering information indicating a message capable of being transmitted/received through the bearer, quality of service (QoS) information of the message capable of being transmitted/received through the bearer, or an address of the gateway connected through the bearer.

18. A method for establishing a bearer of a terminal for transmitting and receiving data in wireless communication system, the method comprising:
receiving, from a base station, configuration information including an indicator indicating whether response data of at least one terminal for the specific data is necessary, for transmitting specific data;
receiving the specific data based on the configuration information from the base station; and
transmitting a response message indicating the response data as a response to the specific data to the base station,
wherein the configuration information includes at least one of reception terminal information indicating the at least one terminal which will receive the specific data, transmission interval information indicating an interval in which the specific data is transmitted, transmission cycle information indicating a cycle in which the specific data is transmitted, type information indicating a type of the specific data, an identity for identifying a resource region of the specific data, resource region information indicating a resource region in which the specific data is included, or identity code information for identifying the specific data, and
wherein a specific bearer is configured between the base station and a gateway if the indicator indicates that the response data is necessary.

19. A base station for transmitting/receiving data in a wireless communication system supporting a low latency service, the base station comprising:
a communication unit transmitting/receiving radio signals to/from an outside; and
a processor functionally coupled to the communication unit,
wherein the processor is configured to,
receive specific data and data transmission information including an indicator indicating whether response data of at least one terminal for the specific data is necessary for a transmission of the specific data from a mobility management entity (MME),
wherein the data transmission information including at least one of reception terminal information indicating the at least one terminal which will receive the specific data or connection terminal information indicating terminals belonging to the at least one terminal and having a connection state with the base station, receives bearer information indicating information related to a specific bearer configured between the base station and a gateway from the MME, and transmits response data for the specific data transmitted by one or more terminals through the specific bearer, and
wherein the specific bearer is configured if the indicator indicates that the response data is necessary.

* * * * *